United States Patent [19]
Suzuki et al.

[11] Patent Number: 5,972,438
[45] Date of Patent: *Oct. 26, 1999

[54] MAGNETIC RECORDING MEDIUM AND METHOD OF MANUFACTURE OF SAME

[75] Inventors: Masayasu Suzuki; Tuyoshi Mochizuki; Hiroshi Kawashima, all of Shizuoka, Japan

[73] Assignee: Tomoegawa Paper Co., Ltd., Tokyo, Japan

[ * ] Notice: This patent is subject to a terminal disclaimer.

[21] Appl. No.: 08/900,824

[22] Filed: Jul. 25, 1997

Related U.S. Application Data

[63] Continuation of application No. 08/534,025, Sep. 26, 1995, abandoned, which is a continuation of application No. 08/165,734, Dec. 10, 1993, Pat. No. 5,480,685.

[30] Foreign Application Priority Data

Oct. 22, 1993 [JP] Japan .................................... 5-265177
Oct. 22, 1993 [JP] Japan .................................... 5-265178

[51] Int. Cl.$^6$ ............................. B42D 107/00; G11B 5/80
[52] U.S. Cl. .......................... 427/548; 427/128; 427/131
[58] Field of Search ........................... 283/82, 901, 904; 235/493; 427/128, 131, 548; 428/40, 195, 201, 212, 694 BM, 900

[56] References Cited

U.S. PATENT DOCUMENTS

| | | | |
|---|---|---|---|
| 3,676,644 | 7/1972 | Vaccaro | 235/61.11 |
| 4,239,959 | 12/1980 | Gutterman | 235/493 |
| 4,242,400 | 12/1980 | Smith et al. | 428/201 |
| 4,244,998 | 1/1981 | Smith et al. | 428/195 |
| 4,584,529 | 4/1986 | Aoyama | 324/261 |
| 4,935,724 | 6/1990 | Smith et al. | 340/551 |
| 4,977,040 | 12/1990 | Yano et al. | 428/692 |
| 5,032,709 | 7/1991 | Lee et al. | 235/493 |
| 5,177,344 | 1/1993 | Peace | 235/449 |
| 5,190,318 | 3/1993 | Mantegazza | 283/82 |
| 5,196,681 | 3/1993 | Mantegazza | 235/449 |
| 5,264,292 | 11/1993 | Kovacs et al. | 428/528 |

FOREIGN PATENT DOCUMENTS

| | | | |
|---|---|---|---|
| 0428779 | 5/1991 | European Pat. Off. | G06K 19/08 |
| 0474061 | 3/1992 | European Pat. Off. | G11B 5/66 |
| 2752895 | 6/1978 | Germany | G11B 5/84 |
| 3244598 | 10/1991 | Japan . | |
| WO92/06445 | 4/1992 | WIPO | G06K 7/08 |

Primary Examiner—Stevan A. Resan
Attorney, Agent, or Firm—Oblon, Spivak, McClelland, Maier & Neustadt, P.C.

[57] ABSTRACT

A magnetic recording medium is made by applying a coating mixture having magnetic particles dispersed in a binder and drying the coating mixture so as to produce a coding layer containing tamper-proof identifier coding information comprising designed patterns, letters, numerals and bar-code type patterns. Another magnetic layer for recording regular magnetic data can be provided above or below the coding layer. The coding information can neither be read or altered by ordinary magnetic reader. The magnetic recording medium is therefore useful for such applications as shopping cards, pre-paid cards, retail store cards; financial cards including credit cards, insurance cards; travelling cards including transit passes, tickets; and identification cards including passports, birth certificates and other personal identification cards. A method of making such a magnetic recording medium is also presented in which the coating mixture is applied on a non-magnetic base material, and while the coating mixture is still wet, i.e. while the magnetic particles are mobile, suitable coding information is magnetically recorded. The coating mixture is then dried to fixate the identifier coding information in the coding layer to produce fixated coding information which is non-erasable and non-alterable.

3 Claims, 12 Drawing Sheets dentified

MAGNETIC RECORDING MEDIUM AND METHOD OF MANUFACTURE OF SAME

This application is a Continuation of application Ser. No. 08/534,025, filed on Sep. 26, 1995, now abandoned, which is a continuation of Ser. No. 08/165,734, filed Dec. 10, 1993 (U.S. Pat. No. 5,480,685, issued Jan. 2, 1996).

BACKGROUND OF THE INVENTION

1. Field of the Invention

The present invention relates to a magnetic recording medium for use in magnetic cards, magnetic sheets and magnetic roll papers for such applications as shopping cards including pre-paid cards, retail store cards; financial cards including credit cards, insurance cards; travelling cards including transit passes, tickets; and identification cards including passports, birth certificates and other personal identification cards.

2. Technical Background

The fields of application of consumer cards containing magnetically recorded information have expanded rapidly in recent years, and the uses of such cards are expanding greatly. The basic structure of such magnetic cards comprises a non-magnetic base material and a magnetic layer formed on top of the non-magnetic base material, and the magnetic layer is used to magnetically record proprietary information. It is essential to prevent unlawful uses enabled by copying or altering of the proprietary information on such media, and there have been many methods which are being used to prevent illegal uses of magnetic cards.

Representative examples of counterfeit preventing measures can be divided into two broad categories: the first method is to make reproduction of magnetic information difficult; and the second method is to incorporate a piece of identifier coding data so as to identify counterfeited cards.

The first method is based on making the reproduction of magnetic information difficult, and there are known examples such as providing a multilayer section for magnetic recording in which to hide the correct information, or providing superfluous information to make analysis of the correct information difficult. However, such methods suffer from the disadvantages of complexity of manufacturing, and the requirement for special equipment to read/write the correct information. Furthermore, once the details of the technique of hiding the correct information are discovered, it is not possible to prevent someone skilled in the art to analyze the data, and to easily duplicate the information or to produce a counterfeit product.

The second method is based on including a special identifier codes in the magnetic card, and such a card cannot be put to actual use unless the card is certified to be genuine, even though the card may contain duplicated magnetic information. However, such cards also suffer from disadvantages of difficult manufacturing process, and the requirement of special reading devices for the identifier codes. Also, this type of card has another major disadvantage that it is not possible to prevent unlawful uses of a genuine card in which the proprietary information has been altered.

SUMMARY OF THE INVENTION

The present invention was made in consideration of the state of the existing state of the art of magnetic recording media, and the objective of the first invention is to present a magnetic recording medium, based on the second approach, having the capability to make it virtually impossible to produce a counterfeit magnetic recording medium by forgery, i.e. an incorporation of an identifier coding information which is non-alterable and non-erasable, and a method of making such a magnetic recording medium.

Another objective of the present invention is to present a magnetic recording medium, based on the second approach, having the capability to provide a different identifier coding information for each recording medium, and the identifier coding information cannot subsequently be altered or deleted, thereby presenting a magnetic recording medium which is superior to the conventional magnetic recording media and is, therefore, highly effective for preventing forgery of proprietary information.

The above objectives are achieved in a magnetic recording medium in which the magnetic recording medium comprises a non-magnetic base material; and a magnetic layer comprising at least one magnetic layer, containing magnetic particles dispersed in a binder, disposed on top of the base material; where at least one magnetic layer defines a coding layer containing pre-recorded identifier coding information for forgery prevention which is fixated in at least one magnetic layer, so that the identifier coding information is readable magnetically but is neither erasable or alterable subsequent to the manufacture of the magnetic recording medium.

An aspect of the present invention is a coding layer of a coercive force of not more than 100 oersted, and the identifier coding information is formed by a plurality of protrusions formed in the magnetic layer comprising designed patterns, letters or bar-code-type patterns formed by localized regions of different concentrations of magnetic particles, and the protrusions protrude away from the non-magnetic base material.

Another aspect is that at least one magnetic layer comprises a first magnetic layer formed on top of the non-magnetic base material, and a second magnetic layer formed on top of the first magnetic layer, wherein the second magnetic layer has a coercive force of not less than 250 and not more than 5,000 oersted, and the first magnetic layer has a coercive force of not more than 100 oersted and defines the coding layer having designed patterns, letters or bar-code-type patterns, pre-recorded and fixated for forgery prevention.

Another aspect is that the identifier coding information recorded on the first magnetic layer defining the coding layer is formed by a plurality of protrusions comprising designed patterns, letters or bar-code-type patterns, which protrude from the coding layer towards the base material.

Another aspect is that the first magnetic layer is attached to the base material with an adhesive layer, and the identifier coding information protrudes from the first magnetic layer and is embedded in the adhesive layer.

Another aspect is that at least one magnetic layer comprises: a first magnetic layer having a coercive force of not less than 250 and not more than 4,000 oersted formed on top of the base material; and a second magnetic layer having a coercive force of not less than 4,500 oersted formed on top of the first magnetic layer, wherein the second magnetic layer defines the coding layer containing non-erasable and non-alterable identifier coding information, comprising designed patterns, letters or bar-code-type patterns, for forgery prevention.

Another aspect is that at least one magnetic layer comprises: a first magnetic layer having a coercive force of not less than 250 and not more than 4,000 oersted formed on top of the base material; and a second magnetic layer having a coercive force of not more than 100 oersted formed on top of the first magnetic layer, wherein the second magnetic layer defines the coding layer containing non-erasable and non-alterable identifier coding information, comprising designed patterns, letters or bar-code-type patterns, for forgery prevention.

Another aspect is that at least one magnetic layer defines the coding layer having a magnetic strength of not more than 100 oersted, and is provided with identifier coding information formed by a plurality of protrusions comprising designed patterns, letters or bar-code-type patterns formed by localized regions of different concentrations of magnetic particles, and the protrusions are disposed on a specific location of the magnetic recording medium, and protrude towards the non-magnetic base material.

Another aspect is that the coding layer is attached to the base material with an adhesive layer, and the plurality of protrusions protrude into the adhesive layer.

Another aspect is that the non-magnetic base material is selected from the group consisting of papers, laminated papers, resins such as polyester resins, synthetic polymer sheets, films and their laminated products.

Another aspect is that the binder is selected from the group consisting of vinyl chloride•vinyl acetate group copolymers, polyurethane group resins, polyester group resins, epoxy group resins.

Another aspect is that the magnetic particles constituting the primary component in the coding layer are selected from the group consisting of the powders of at least one of carbonyl iron powder, zinc ferrite, manganese zinc ferrite, nickel, magnetite, Permalloy comprising Ni—Fe, Sendust comprising Fe—Si—Al, and Alperm comprising Fe—Al.

Another aspect is that the magnetic particles constituting the primary component in the magnetic layer, are selected from the group consisting of at least one powder of γ-iron oxide, cobalt doped γ-iron oxide, chromium oxide, barium ferrite, strontium ferrite.

Another aspect are that the magnetic particles constituting the primary component in the coding layer is selected from the group consisting of at least one of barium ferrite, strontium ferrite and related compound with replaced metal ions.

A method is presented for making a magnetic recording medium in which magnetic particles are dispersed in a dried coating mixture on a non-magnetic base material, comprising the steps of: applying a coating mixture comprising magnetic particles dispersed in a wet coating mixture on the base material to produce a wet coated sheet; subjecting the wet coated sheet to a magnetic encoding process while the magnetic particles are mobile; and subjecting the wet coated sheet to a drying process to produce a stock sheet having at least one magnetic layer having magnetic particles fixated in the dried coating mixture, wherein the magnetic encoding process and the drying process convert the at least one magnetic layer to a coding layer in which identifier coding information comprising designed patterns, letters or bar-code-type patterns is fixated for forgery prevention.

Another aspect of the method presented above is that the coding layer is formed with a coating mixture so as to produce a coercive force of not more than 100 oersted in the coding layer, and the magnetic configuration processing are applied with a permanent magnet or an electromagnet from the back surface of the wet coated sheet opposite to the coating mixture while the magnetic particles in the coating mixture is mobile.

Another aspect of the method is that the coding layer of a coercive force of not more than 100 oersted is overlaid with a magnetic layer having a coercive force of not less than 250 oersted and not more than 4,000 oersted.

Another aspect of the method is that the magnetic layer having a coercive force of not less than 250 oersted and not more than 4,000 oersted is overlaid with a coding layer of a coercive force of not more than 100 oersted.

Another aspect of the method is that a first magnetic layer is formed on the base material by applying a first coating mixture to produce a magnetic layer having a coercive force of not less than 250 oersted and not more than 4,000 oersted, and drying the coating mixture; recording identifier coding information on the first magnetic layer; applying a second coating mixture having a coercive force of not less than 4,000 oersted on the first magnetic layer to produce a second magnetic layer so as to duplicate the identifier coding information recorded in the first magnetic layer in the second magnetic layer, and drying the second magnetic layer to produce a coding layer containing non-erasable and non-alterable fixated identifier coding information for forgery prevention.

Another aspect of the method is that a first magnetic layer is formed on the base material by applying a first coating mixture having a coercive force of not less than 250 oersted and not more than 4,000 oersted, and drying to produce a first magnetic layer; recording magnetic information on the first magnetic layer; applying a second coating mixture having a coercive force of not more than 100 oersted on the first magnetic layer to produce a second magnetic layer so as to form protrusions in the second coating mixture by the magnetic field generated by the first magnetic layer; and drying the second magnetic layer to produce the protrusions in the magnetic layer constituted by designed patterns, letters or bar-code-type patterns formed by localized regions of different concentrations of magnetic particles or in the layer thickness, pre-recorded and fixated for forgery prevention.

A method is presented for making a magnetic recording medium having pre-recorded and fixated identifier coding information for forgery prevention, comprising the steps of: forming a first magnetic layer comprising a dried binder medium and magnetic particles having a coercive force of not less than 250 oersted and not more than 5,000 oersted on a non-magnetic holding material; recording identifier coding information on the first magnetic layer magnetically; forming a second magnetic layer comprising a binder medium and magnetic particles of a coercive force of not more than 100 oersted so as to serve as a coding layer by duplicating the magnetic information recorded on the first magnetic layer in the second magnetic layer; forming an adhesive layer on top of the second magnetic layer to produce a magnetic transfer tape; transferring the first magnetic layer and the second magnetic layer defining the coding layer from the magnetic transfer tape to a non-magnetic base material to make the magnetic recording medium.

An aspect of the method for making the recording medium is the identifier coding information duplicated in the second magnetic layer is produced by forming protrusions having localized regions of different concentrations of magnetic particles in the second magnetic layer while the magnetic particles are mobile within the binder medium; and fixating the protrusions by removing a solvent from the binder medium by evaporation.

A method is presented for making a magnetic recording medium comprising a transfer tape having pre-recorded and fixated identifier coding information for forgery prevention, attached to a base material, comprising the steps of: forming a first magnetic layer comprising a dried binder medium and magnetic particles having a coercive force of not less than 250 oersted and not more than 5,000 oersted on top of a non-magnetic holding base via a peeling layer; recording identifier coding information magnetically on the first magnetic layer; forming a second magnetic layer comprising a binder medium and magnetic particles having a coercive force of not more than 100 oersted on top of the first magnetic layer so as to serve as a coding layer by duplicating and fixating the identifier coding information while the magnetic particles in the second magnetic layer are mobile; forming an adhesive layer on top of the second magnetic layer so as to form a magnetic transfer tape; attaching the magnetic transfer tape on a non-magnetic base material and peeling the second magnetic layer from the first magnetic layer to make the magnetic re cording medium.

An aspect of the method presented above is that the identifier coding information duplicated in the second magnetic layer is formed by protrusions localized regions of different concentrations of magnetic particles fixated in the second magnetic layer by removing the binder medium by evaporation

BRIEF EXPLANATION OF THE DRAWINGS

FIG. 9 (B) is an illustration of another waveform of the magnetic pulses applied to the magnetic head in the first embodiment.

FIG. 10 (B) is a longitudinal cross sectional view of the magnetized section seen at the line X–X' in FIG. 10 (A); and FIG. 10 (C) is a longitudinal cross sectional view of the demagnetized first magnetic layer one seen at the line X–X' in FIG. 10 (A).

FIG. 13 (B) is a longitudinal cross sectional view of the magnetized section seen at the line $X_1$–$X_2$ in FIG. 13 (A); and FIG. 13 (C) is a magnified view of the longitudinal cross section between the first magnetic layer and the second magnetic layer at the line $X_1$–$X_2$ in FIG. 13 (A).

FIG. 17 (B) is a transverse cross sectional view of another example of the fourth embodiment.

FIG. 21 (B) is a transverse cross sectional view of another example of the fourth embodiment.

PREFERRED EMBODIMENTS

A first embodiment of the present invention will be explained with reference to the drawings.

Figure 1:
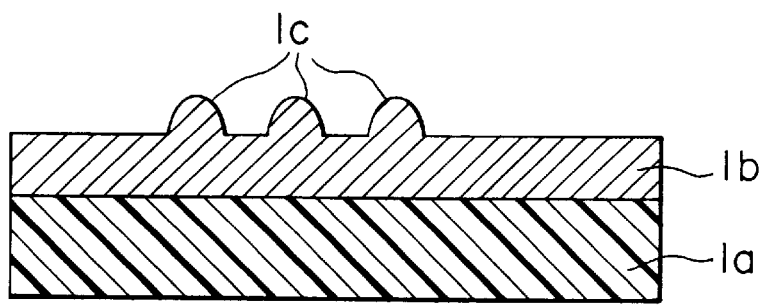
FIG. 1 is a longitudinal cross sectional view of a first embodiment of the magnetic recording medium of the present invention.
Figure 2:
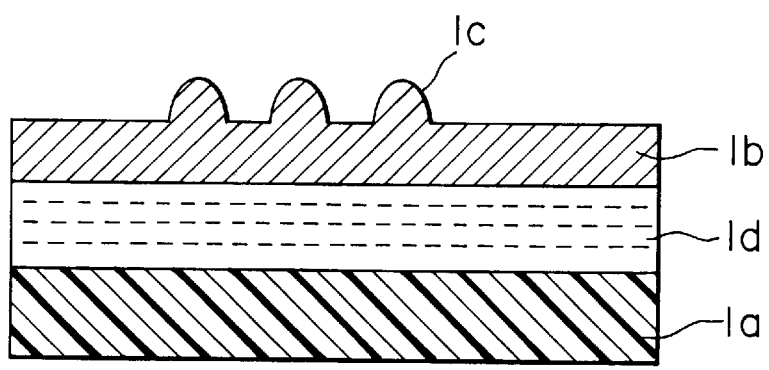
FIG. 2 is a longitudinal cross sectional view of another example of the magnetic recording medium of the first embodiment.
Figure 3:
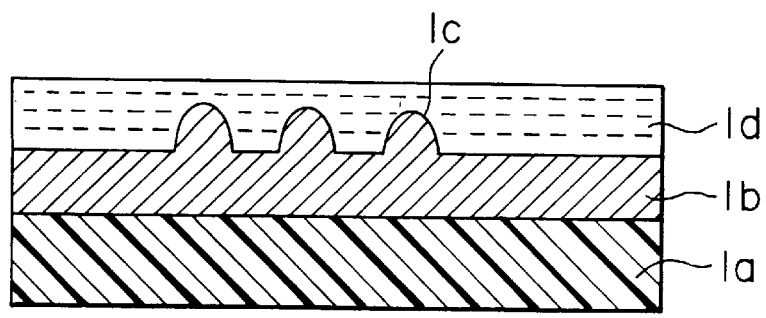
FIG. 3 is a longitudinal cross sectional view of another example of the magnetic recording medium of the first embodiment.

FIGS. 1, 2 and 3 illustrate two examples of a first embodiment of the recording medium in accordance with the present invention. FIG. 1 shows an example of the magnetic recording medium (hereinafter referred to as the recording medium) comprising a non-magnetic base material 1a overlayed with a magnetic coding layer 1b having a low coercive force of less than 100 oersteds, containing counterfeit-preventing fixated information 1c made up of pattern data such as design patterns, letters and numerals. FIG. 2 shows another example in which the base material 1a is overlayed with a magnetic layer 1d, followed by a magnetic coding layer 1b as in FIG. 1 to contain counterfeit-preventing fixated information 1c made up of patterned data such as design patterns, letters and numerals. In the example shown in FIG. 3, the magnetic layer 1d is provided on top of the coding layer 1b.

Figure 4:
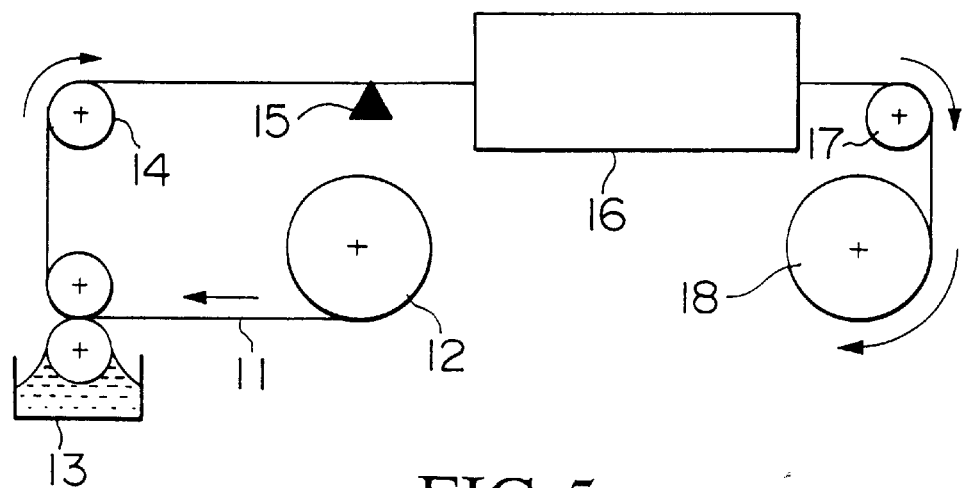
FIG. 4 is an illustration of the method of making the magnetic recording medium of the first embodiment.

FIG. 4 illustrates an example of the manufacturing process for making the recording medium. In this case, the base material sheet 11 is sent from the forwarding reel 12 to be coated with a magnetic coating mixture in a coating apparatus 13. The coated sheet continues via an idler roll 14 to a magnetic encoding device 15 to be magnetized, and after being dried in a dryer 16, passes through another idler roll 17 to be picked up by a pick-up reel 18. The magnetic coating mixture comprises a solvent-based binder in which fine magnetic particles are dispersed along with minute amounts of additives, as necessary.

Figure 5:
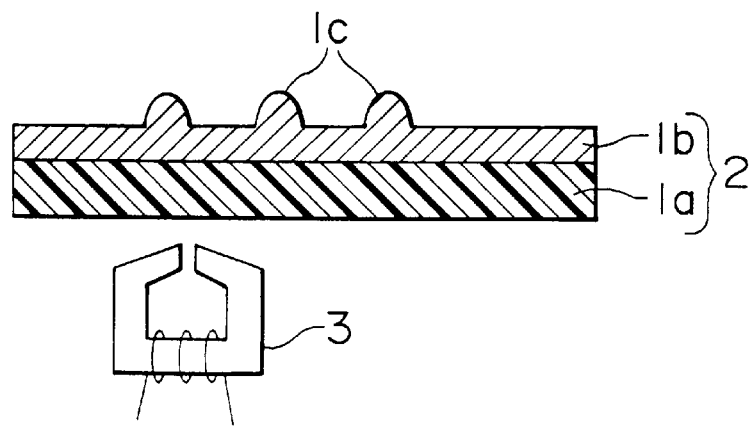
FIG. 5 is a longitudinal cross sectional view of an example of recording on a magnetic medium with a magnetic head in the first embodiment.

In the above case, a method of forming the coding information is illustrated in FIG. 5, in which the magnetic recording sheet 2, comprising a non-magnetic base material 1a overlayed with a magnetic coding layer 1b having a low coercive force of less than 100 oersteds, is coded with fixated information 1c by magnetically coding the magnetic coding layer 1b with an electromagnet 3 from the bottom surface of the sheet 2.

Figure 6:
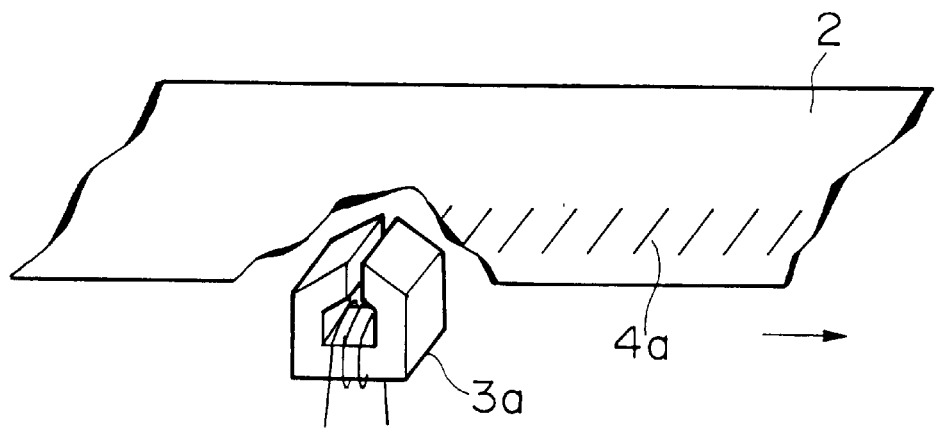
FIG. 6 is a longitudinal cross sectional view of another example of recording on a magnetic medium with a magnetic head in the first embodiment.
Figure 7:
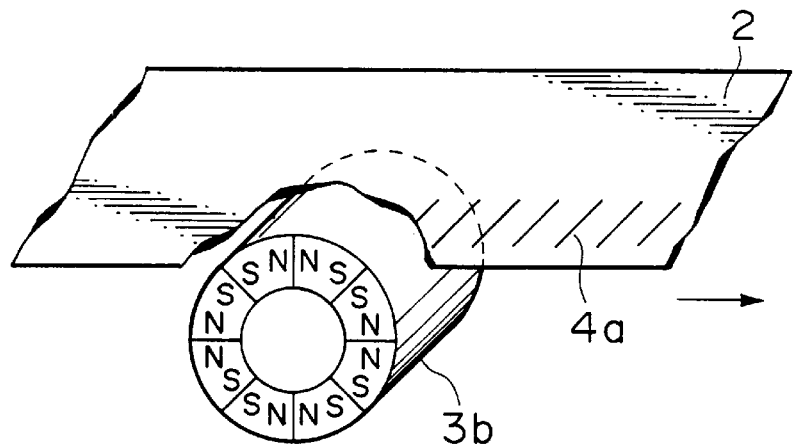
FIG. 7 is a longitudinal cross sectional view of another example of recording on a magnetic medium with a permanent magnetic roll in the first embodiment.
Figure 8:
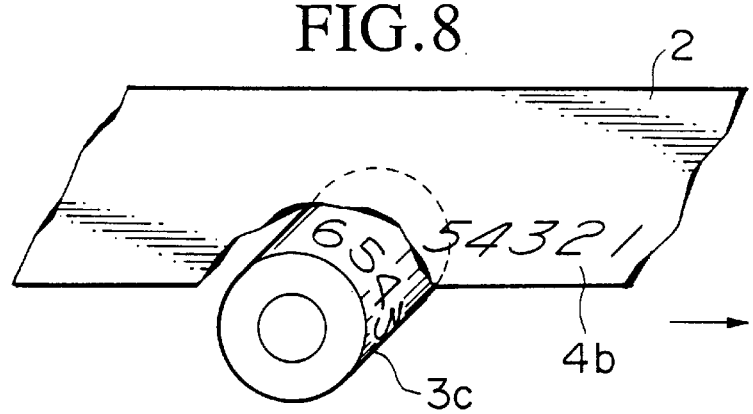
FIG. 8 is a longitudinal cross sectional view of another example of recording on a magnetic medium with a permanent magnetic roll in the first embodiment.

FIGS. 6, 7 and 8 illustrate different approaches to coding the fixating information using various types of magnets. FIG. 6 is a case of entering the magnetic information as bar codes 4a using an electromagnet 3a from the back surface (opposite to the magnetic layer) of the pre-dried recording sheet 2. FIG. 7 is a case of entering the bar codes 4 using a permanent magnet assembled as a roll 3b. FIG. 8 is a case of entering magnetic information as numeral codes 4b using an assembled roll-type permanent magnet 3c having the numeral patterns.

Figure 9A:
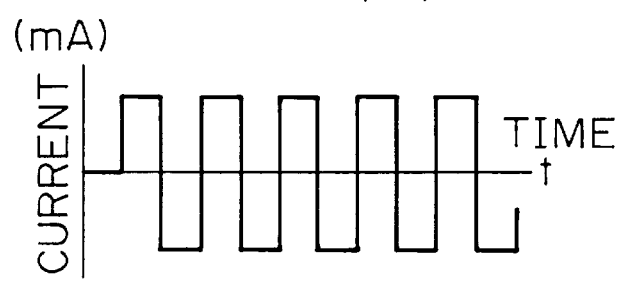
FIG. 9 (A) is an illustration of a waveform of the magnetic pulses applied to the magnetic head in the first embodiment.
Figure 9B:
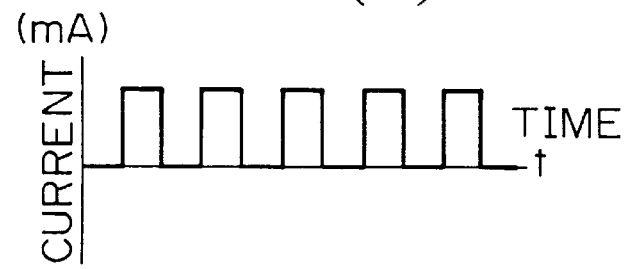

It is evident that the numeral codes can be replaced by design patterns or letters arranged in the same roll-type permanent magnet as above. In this case, the counterfeit preventing coding information may be configured easily by passing pulsed current to the electromagnet as illustrated in FIGS. 9 (A) and (B).

With an electromagnet as in FIG. 6, it is possible to form bar-code type patterns in accordance with pulsed currents. With an assembled permanent magnet, the magnetic field reaches a maximum at the boundary of reversing magnetic polarities, therefore, it is possible to form bar code patterns in accordance with the shape of the boundaries.

The coding patterns thus formed are fixated by drying the magnetic coding layer by evaporating the solvent therefrom. The fixated coding information is made up of patterned groups of low coercive magnetic particles which have become confined in place. The fixated information will not generate signals when reproduction is attempted with an ordinary magnetic head. The patterns will not be magnetized, and thus cannot be detected with a magnetic viewer.

However, it is possible to generate magnetic identifier coding in accordance with the magnetic patterns when the reproduction is carried out with a magnetic head with an external biasing magnetic field. The magnetic identifier can neither be erased or modified, therefore, the patterns are tamper-proof, and are ideal for use as counterfeit-preventing fixated information.

If the magnetic cards are manufactured as shown in FIG. 4 by giving various signal patterns to the magnetic encoding section, such various patterns formed by the fixated coding information can serve as individual identifier patterns for individual group of cards. In other words, each card produced from such tape stock will have its own identifier information, and if such identifier information is used as the finger print information for the card, it is virtually impossible to produce a counterfeit by duplicating the finger print information.

Next, the material of construction of the recording medium will be explained. First, the base material can be made from a non-magnetic material in a sheet form of 150 µm to 1 mm thickness such as polyester film, vinyl chloride, synthetic paper, wood pulp paper, laminated paper.

The magnetic particles used for magnetic layer can be made from γ-iron oxide, cobalt doped γ-iron oxide, chromium oxide, barium ferrite, strontium ferrite and the like, and the powder of such magnetic particles is dispersed, together with an additive such as a pigment, in a binder, such as vinyl chloride•vinyl acetate group copolymers, vinyl chloride•vinyl acetate•vinyl alcohol group copolymers, polyurethane group resins, polyester group resins, epoxy group resins, polyisocyanate group resins, to make a coating mixture. The coating mixture is applied to the base material and dried to produce a magnetic layer.

The material to be used for the magnetic coding layer having a low coercive force of less than 100 oersted can be made from a magnetic powder such as carbonyl iron powder, zinc ferrite, manganese zinc ferrite, nickel, magnetite, Permalloy (Ni—Fe), Sendust (Fe—Si—Al), and Alperm (Fe—Al). The powder material is dispersed, together with an additive such as a pigment, in a binder as in the case of making the magnetic layer, and the coating mixture thus made is applied on top of the base material or on top of the magnetic layer to produce a magnetic coding layer having a low coercivity.

The magnetic coding layer may be overlaid with a protective covering layer, depending on the need, made from:

(a) a coloring layer containing such material as aluminum powder or white pigment to hide the coloring of the magnetic layer;

(b) a print magnetic layer comprised of a thermal magnetic layer made of leuco dye type, or a discharge magnetic layer made by metal vapor depositing of such metals as tin or aluminum.

(c) a protective covering layer comprising a UV-hardenable resin.

One or more of the above mentioned layer can be applied as a single or a multiple layer.

Next, a second embodiment will be explained.

Figure 10A:
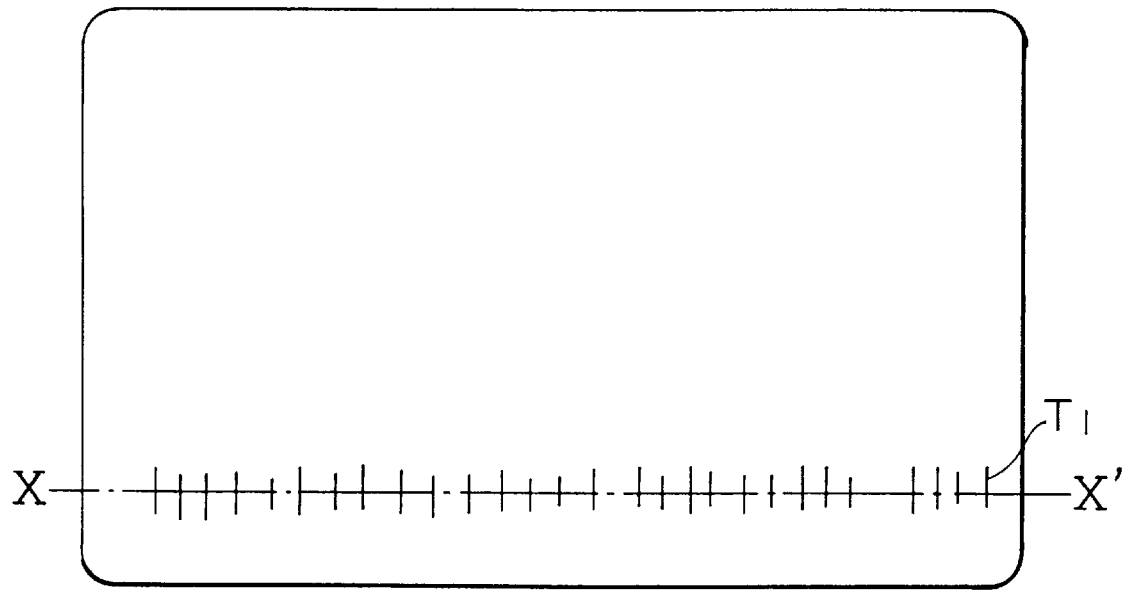
FIG. 10 (A) is a plan view of a magnetic recording medium in a second embodiment.
Figure 10B:
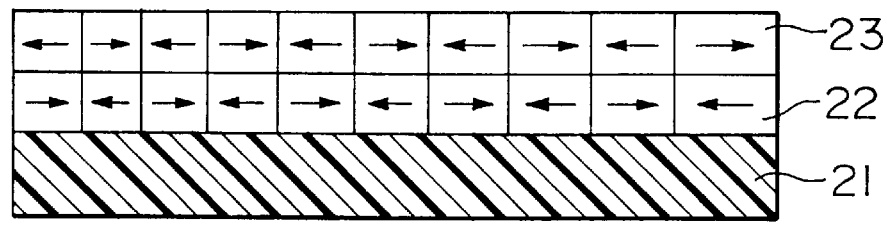
Figure 10C:
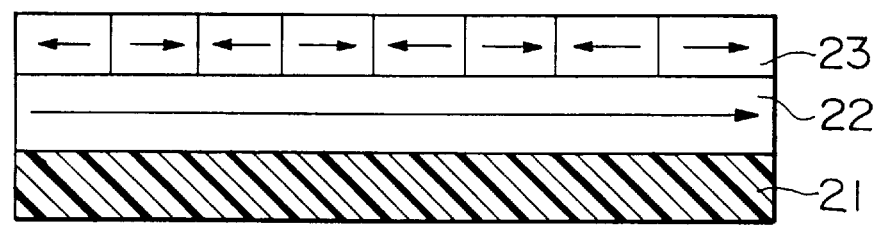

FIG. 10 (A) is a plan view of a magnetic recording medium (magnetic card) of the second embodiment having a magnetic recording track $T_1$. FIG. 10 (B) is a cross sectional view through the track $T_1$ at the line X–X'. The track $T_1$ comprises: a base material 21; a first magnetic layer 22, containing magnetic particles of coercivity between 250 to 4,000 oersted and a binder, overlayed on the base material 21; and a second magnetic layer 23, containing magnetic particles of coercivity over 4,500 oersted, for recording the identifier coding information which cannot be erased or altered. As necessary, a protective covering layer (not shown) can be applied on top of the second magnetic layer 23.

The material of construction of the second embodiment will be explained.

The base material 21 can be made of the same material as explained in the first embodiment.

The magnetic particles for use in the first magnetic layer 22 can be made from γ-iron oxide, cobalt doped γ-iron oxide, chrome oxide, barium ferrite, strontium ferrite and the like. The powder of such magnetic particles is dispersed, together with an additive such as a pigment, in a binder, such as vinyl chloride•vinyl acetate group copolymer, vinyl chloride•vinyl chloride•vinyl acetate•vinyl alcohol group copolymers, polyurethane group resins, polyester group resins, epoxy group resins, polyisocyanate group resins, to make a coating mixture. The coating mixture is applied to the base material 21 and dried to produce the first magnetic layer 22.

The magnetic particles for use in the second magnetic layer 23 can be made from barium ferrite, strontium ferrite and related compound with the replaced metal ions. The magnetic particles are dispersed, together with an additive such as a pigment, in a binder as in the case of making the magnetic layer, and the coating mixture thus made is applied on top of the first magnetic layer 22 to produce a second magnetic layer. Also, as in the first embodiment, the protective covering layer 23 can be made in the same way and applied as necessary on top of the second magnetic layer 23.

Figure 11:
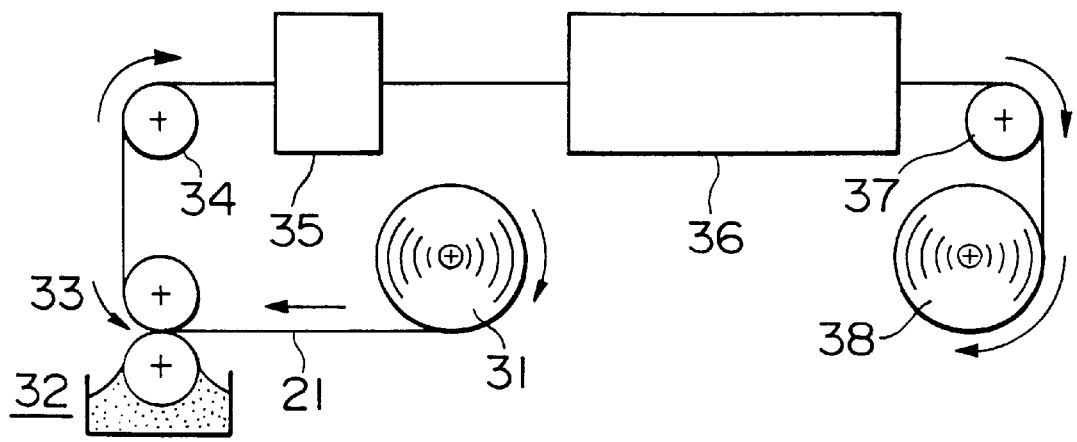
FIG. 11 is an illustration of the coating process for the first magnetic layer in a second embodiment.

Next, the method of manufacturing the magnetic recording medium of the second embodiment will be explained. For example, as shown in FIG. 11, the base sheet material 21 is sent from the forwarding reel 31, and is coated wish the coating mixture in the coating apparatus 32 having a coating head 33 for forming the first magnetic layer 22. The undried coated sheet material is passed over an idler roll 34 to reach the magnetic orientation station 35, and after passing through the dryer section 36, and an idler roll 37 to be picked up by the take-up reel 38. The stock sheet has only the first magnetic layer 22 thereon.

Incidentally, magnetic orientation may or may not be carried out on the first magnetic layer at this time.

Figure 12:
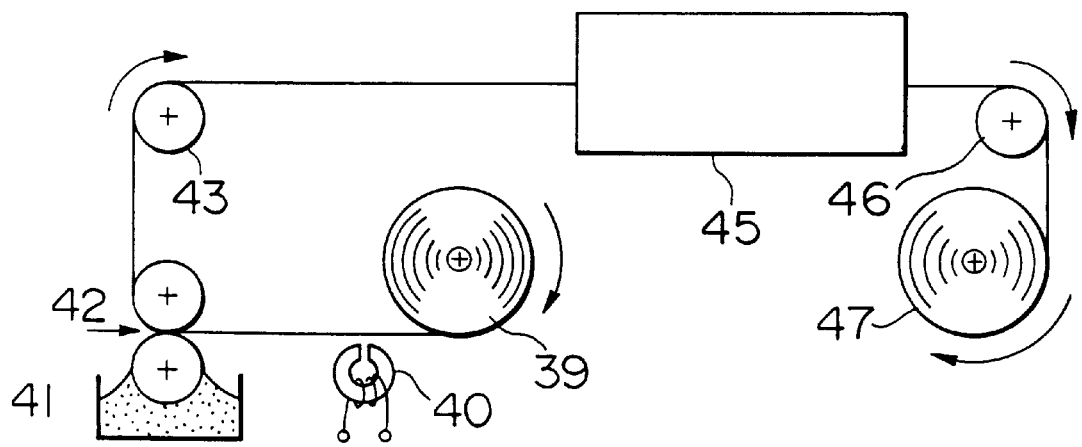
FIG. 12 is an illustration of the coating process for the second magnetic layer in the second embodiment.

Next, as shown in FIG. 12, the pick-up reel 38 loaded with the stock sheet containing the first magnetic layer is made to be the forwarding reel 39. In this processing step, the stock sheet is first processed with a magnetic head 40 to record information on the first magnetic layer 22. The stock sheet then proceeds to a second magnetic layer coating apparatus 41 for applying a second magnetic layer 23 with a coating head 42. Then, passing through an idler roll 43, and, after going through a dryer section 45 and an idler roll 46, the stock sheet is picked up by the pick-up reel 47 to produce the magnetic recording medium of the second embodiment.

If a protective covering layer is required, it can be easily applied in another apparatus(not shown).

In the above method, because the first magnetic layer 22 has a coercive force of between 250 to 4,000 oersted which is the same strength as the ordinary magnetic recording medium, magnetic information can readily be inputted using ordinary magnetic recording devices. When the second magnetic layer 23 is applied, the coercive force of the layer 23 while still wet with the coating mixture is temporarily lower than the final coercive force of 4,500 oersted. Therefore, the magnetically recorded information on the first magnetic layer 22 is transferred onto the still undried second magnetic layer 23, and is duplicated in the layer 23.

When the second magnetic layer 23 is dried, the magnetically recorded information is fixated in the medium having a high magnetic force of 4,500 oersted, and the recorded information cannot be erased or altered subsequently using ordinary magnetic head, thus enabling to provide tamper-proof magnetic information to the recording medium. For conventional magnetic cards, it is impossible to provide individual tamper-proof coding to individual card. However, according to the recording medium of the second invention, individual identifier coding can be provided on the second magnetic layer 23 by copying of the individual identifier coding recorded on the first magnetic layer 22, and the duplicated identifier coding can be fixated in and become tamper-proof after the second recording is fixated.

A third embodiment will be explained below with reference to the drawings.

Figure 13A:
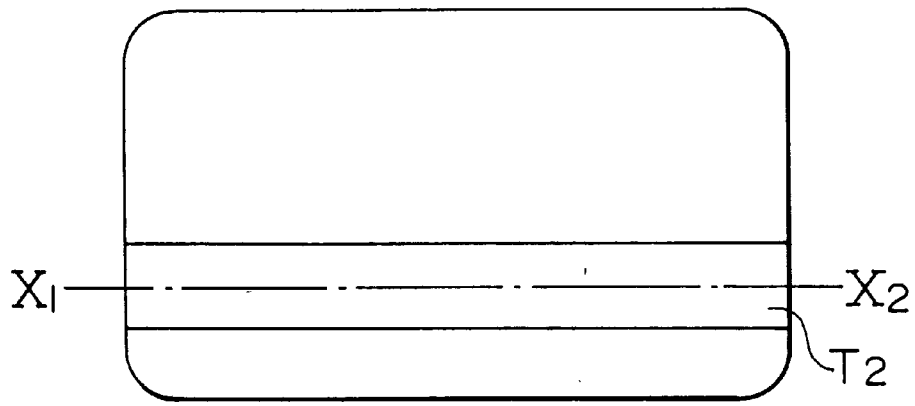
FIG. 13 (A) is a plan view of a magnetic recording medium in a third embodiment.
Figure 13B:
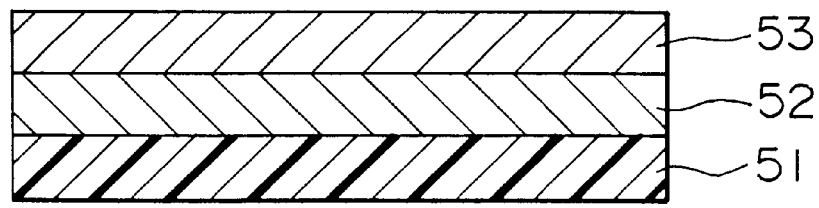
Figure 13C:
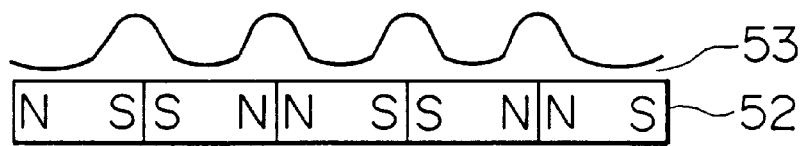

FIG. 13 (A) is a plan view of a magnetic recording medium (magnetic card) of the third embodiment having a magnetic recording track $T_2$. FIG. 13 (B) is a cross sectional view through the track $T_2$ at the line $X_1$–$X_2$. The track $T_2$ comprises: a base material 51; a first magnetic layer 52, containing magnetic particles of coercivity between 250 to 4,000 oersted and a binder, overlayed on the base material 51; and a second magnetic layer 53, containing magnetic particles having a coercive force of less than 100 oersted, for recording the identifier coding information which cannot be erased or altered. As necessary, a protective covering layer (not shown) can be applied on top of the second magnetic layer 53.

After the magnetic recording of the first magnetic layer 52 and the second magnetic layer 53 as shown in FIG. 13 (B), the magnetic particles in the second magnetic layer 53 collect at the boundaries of alternating polarities in the magnetic layer 52, as shown in FIG. 13 (C). The resulting pattern is a bar code like pattern, which becomes fixated in the second magnetic layer 53.

The materials of construction of the third embodiment will be explained.

For the base material 51, the same type of materials mentioned in the previous embodiments can be used.

For the magnetic particles in the first magnetic layer 52, the same type of materials used for the first magnetic layer 22 in the previous embodiments can be used.

For the magnetic particles in the second magnetic layer 53, a magnetic powder such as carbonyl/iron powder, zinc ferrite, manganese zinc ferrite, nickel, magnetite, Permalloy (Ni—Fe), Sendust (Fe—Si—Al), and Alperm (Fe—Al). The powder material is dispersed, together with an additive such as a pigment, in a binder as in the previous embodiments, and the coating mixture thus made is applied on top of the first magnetic layer 52, and dried to produce the second magnetic layer 53.

The protective covering layer provided on top of the second magnetic layer 53 can be selected from the same type of materials mentioned in the previous embodiments.

Figure 14:
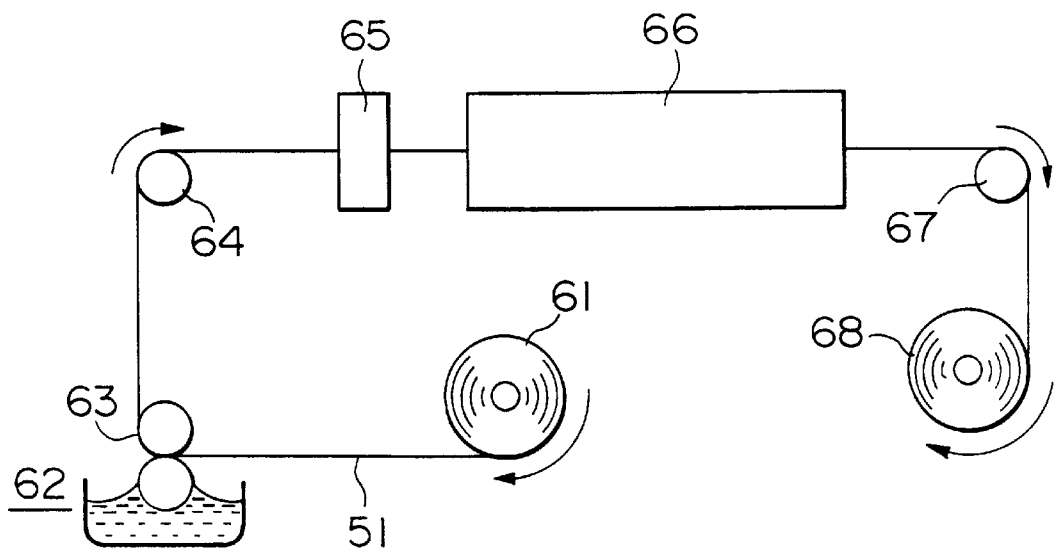
FIG. 14 is an illustration of the coating process of the first magnetic layer of the third embodiment.

Next, the method of manufacturing of the recording medium of the third embodiment will be explained. For example, as shown in FIG. 14, the base sheet material 51 is sent from the forwarding reel 61, and is coated in the coating apparatus 62 having a coating head 63 for forming the first magnetic layer 52. The coated sheet material is passed over an idler roll 64 to reach the magnetic orientation station 65, and after passing through the dryer section 66, and an idler roll 67 to be picked up by the pick-up reel 68. It is preferable that the first magnetic layer 52 be magnetically oriented at this time, but it is not mandatory.

Figure 15:
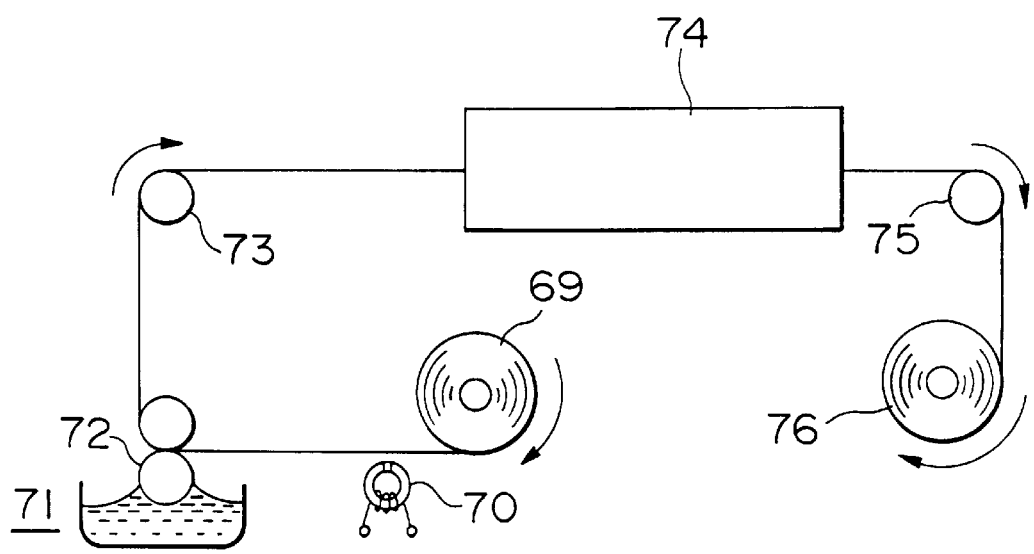
FIG. 15 is an illustration of the coating process of the second magnetic layer of the third embodiment.

Next, as shown in FIG. 15, the pick-up reel 68 loaded with the stock sheet containing the first magnetic layer is made to be the forwarding reel 69. In this processing step, the stock sheet is first processed with a magnetic head 70 to record magnetic information on the first magnetic layer 52. The stock sheet then proceeds to a second magnetic layer coating apparatus 71 for applying a second magnetic layer 53 with a coating head 72. Then, passing through an idler roll 73, the dryer section 74, and another idler roll 75 is picked up by the pick-up reel 76 to produce the magnetic recording medium of the third embodiment.

If a protective covering layer is required, it can be easily applied in another facility (not shown).

In the above method, because the coercive force of the first magnetic layer 52 is between 250 to 4,000 oersted which is the force for regular magnetic recording medium, magnetic information can be inputted with an ordinary magnetic recording head after forming the first magnetic layer 52. If the force is less than 250 oersted, there is a danger of having the recorded information erased by an external magnetic field, and if the force is over 5,000 oersted, it becomes impossible to record with an ordinary magnetic recording head.

Also, the coercive force of the second magnetic layer 53 is low at less than 100 oersted. This is because if it is stronger than 100 oersted, the magnetic particles are difficult to be collected in a form as shown in FIG. 13 (C), as well as the fact that the magnetic patterns can be recognized with a magnetic viewer.

In this embodiment, the second magnetic layer 53 is applied over the first magnetic layer 52, and before the second magnetic layer 53 dries, the magnetic patterns in the first magnetic layer 52 are duplicated in the second magnetic layer 53 by the low coercivity particles. When the second magnetic layer 53 is dried, the magnetic patterns, produced by the low coercive magnetic particles of less than 100 oersted, become fixated in the second magnetic layer 53, thereby providing tamper-proof identifier coding which cannot be erased or altered subsequently with an ordinary magnetic head.

According to this embodiment, the magnetic information on the first magnetic layer 52 is duplicated in accordance with the patterns thereon. In other word, although it is not possible in the conventional type cards to provide individual tamper-proof coding to each card individually, according to the recording medium of this embodiment, individual identifier coding can be provided on the second magnetic layer 53 by copying of the individual identifier coding recorded on the first magnetic layer 52, and the duplicated identifier coding can be fixated in and become tamper-proof after the second magnetic layer is dried.

Figure 16:
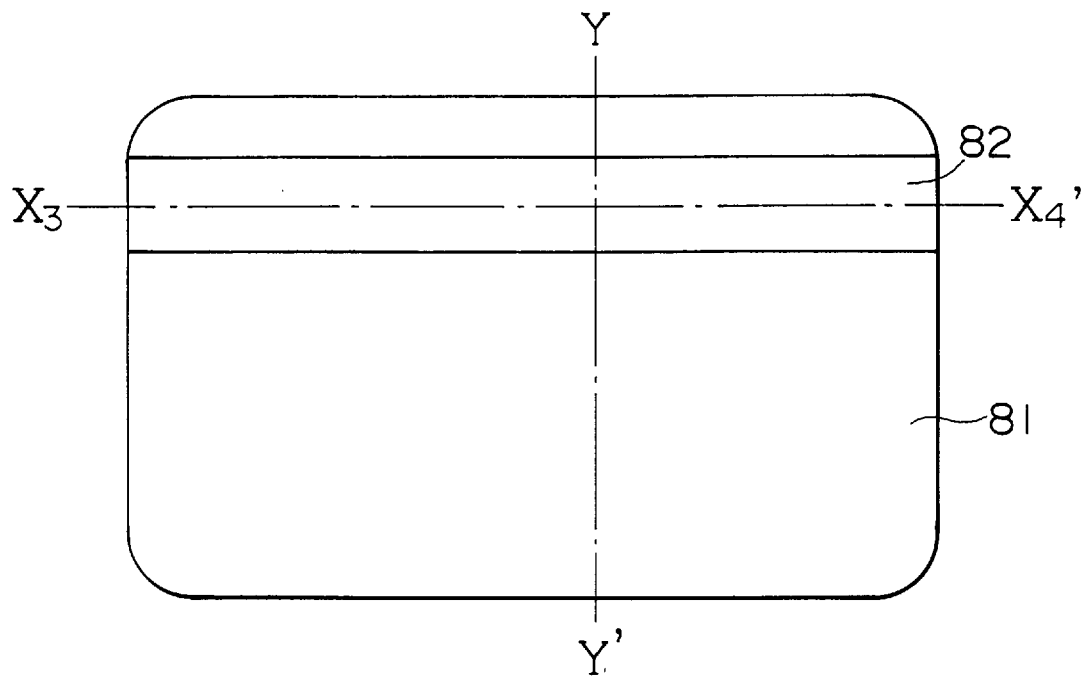
FIG. 16 is a fourth embodiment of the magnetic recording medium.

A fourth embodiment will be explained in the following with reference to the drawings FIG. 16 is an example of the fourth embodiment which comprises a recording medium A having a card-type base material 81 and a magnetic recording stripe member 82 formed longitudinally on one side of the top surface of the base material 81.

Figure 17A:
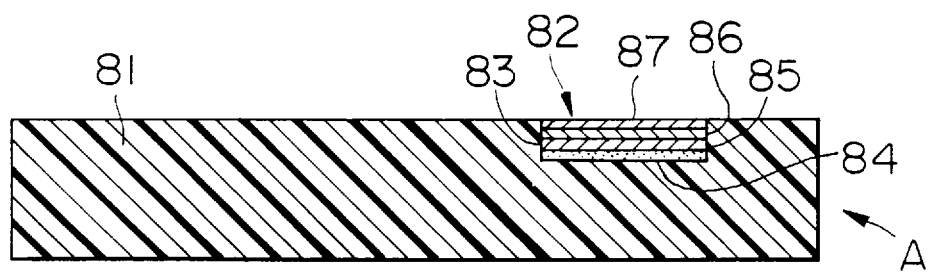
FIG. 17 (A) is a transverse cross sectional view of the magnetic recording medium along the line Y–Y' shown in FIG. 16.
Figure 17B:
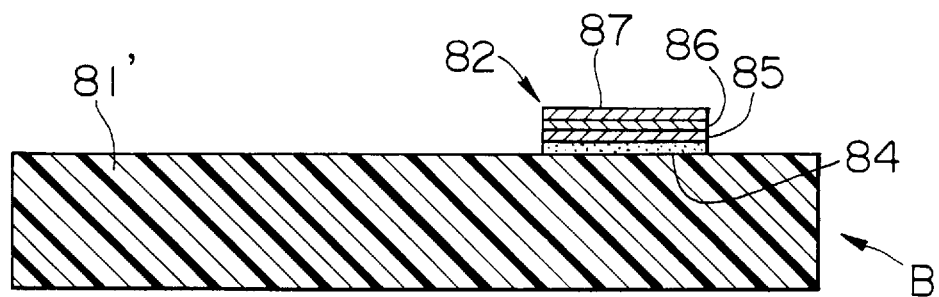

FIG. 17 (A) is a cross sectional view of the transverse section taken along the line Y–Y' of the recording medium A, including the magnetic stripe member 82 embedded in a groove 83 on one side. The stripe member 82 comprises an adhesive layer 84 formed at the bottom of the groove 83, and a successive overlay layers of first magnetic layer 85, a second magnetic layer 86 and a protective covering layer 87.

The protective covering layer 87 is for the protection of the second magnetic layer 86, and may be deleted in some cases. It is also permissible to form a coloring layer or a metallic vapor deposition layer between the protective covering layer 87 and the second magnetic layer 86, depending on the need. Further, this type of magnetic recording medium A is made by thermal bonding of the adhesive layer 84, the first magnetic layer 85, the second magnetic layer 86 and the protective covering layer 87 together to form a unitized member.

It is also permissible to have a recording medium, as shown in FIG. 17 (B) such that the stripe member 82, comprising the adhesive layer 84, the first magnetic layer 85, and the second magnetic layer 86, is overlayed on top of the base material 81'.

The base material 81 can be made from a non-magnetic material in sheet form of 150 $\mu$m to 1 mm thickness such as polyester film, vinyl chloride, synthetic paper, wood pulp paper, laminated paper. Any material to suit the purpose may be used, and therefore, sheet or film type material generally known to be used for magnetic recording purposes, singly or in laminated form are applicable.

The adhesive layer 84 can be a hot melt type adhesive, for example, adhesives of vinyl chloride•vinyl acetate group copolymers, polyester group resins, polyamide group resins, polyurethane group resins may be used singly on mixed.

The second magnetic layer 86 comprises a binder in which magnetic powder particles having a coercive force of over 250 oersted, for example, between 250 to 5,000 oersted, are dispersed therein.

The magnetic particles can be selected suitably from γ-iron oxide having a coercive force of 250–400 oersted; cobalt-clad γ-iron oxide of 600–700 oersted; barium ferrite of 1,600–1,900 oersted or 2,500–3,000 oersted. It is, of course, permissible to use known magnetic powder particles such as chromium oxide and strontium ferrite.

The first magnetic layer 85 comprises a binder in which magnetic powder particles having a coercive force of less than 100 oersted are dispersed therein. The magnetic particles may be selected from powders of carbonyl iron powder, zinc ferrite, manganese zinc ferrite, nickel, magnetite, Permalloy (Ni—Fe), Sendust (Fe—Si—Al), and Alperm (Fe—Al).

The binder for use in dispersing the magnetic particles and anchoring them in the first magnetic layer 85 and the second magnetic layer 86 may be selected from vinyl chloride•vinyl acetate group copolymers, polyurethane group resins, polyester group resins, epoxy group resins, with a small amount of an additive such as pigment. Other known binders for magnetic particles may also be used. In addition, the additive may be selected from inorganic materials such as silica, alumina or organic materials such as wax and silicone oil.

Figure 18:
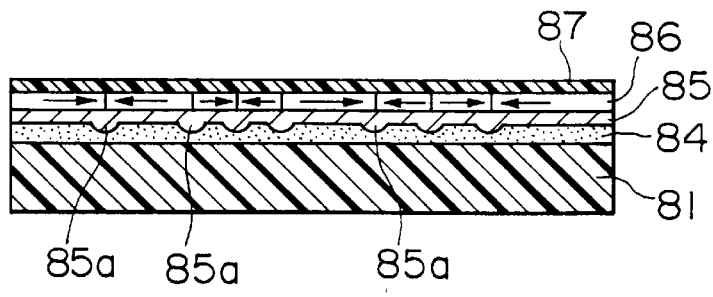
FIG. 18 is a magnified view of the transverse cross section of the magnetic medium at the line $X_3$–$X_4$ shown in FIG. 16.

The bottom surface of the first magnetic layer 85 is provided with a plurality of uniformly spaced protrusions 85a as shown in FIG. 18. These protrusions 85a are formed by the magnetic particles and the binder in the first magnetic layer 85 collecting in such a way to form the protrusions. The magnetic particles collect densely at and near the protrusions 85a. Accordingly, the bottom surface of the first magnetic layer 85 is provided with a type of magnetic patterns formed by the protrusions 85a.

The protective covering layer 87 can be selected from acrylic group resins, cellulose group resins, urethane group resins, epoxy group resins, vinyl chloride•vinyl acetate group copolymers used singly or mixed.

FIG. 18 is an enlarged view of a longitudinal section taken through a line $X_3$–$X_4$ in FIG. 16, and shows the layered structure having the base material 81, the adhesive layer 84, the first magnetic layer 85, the second magnetic layer 86 and the protective covering layer 87.

Next, an example of the method of manufacturing the recording medium of the fourth embodiment will be presented.

In this embodiment, the method involves a step of making a magnetic transfer tape member first followed by a step of making the magnetic recording medium B.

Figure 19:
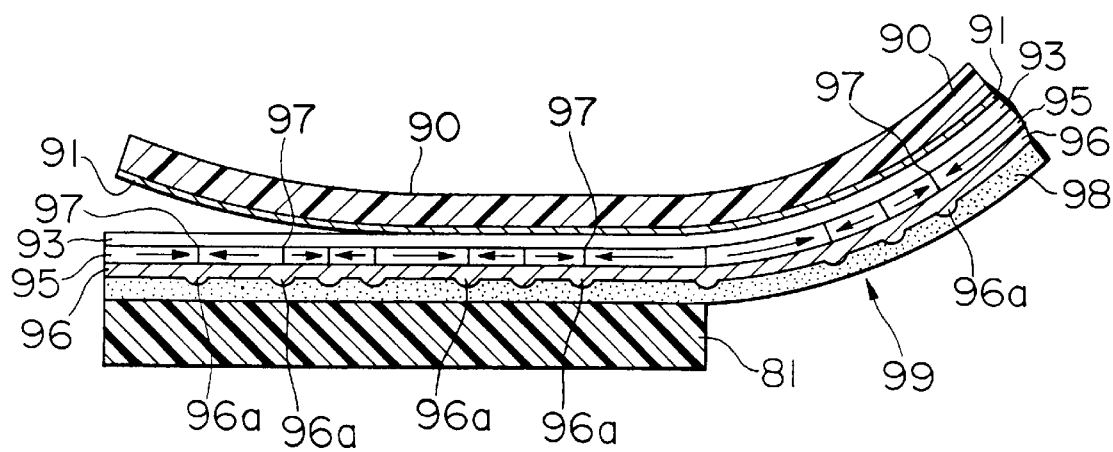
FIG. 19 is a longitudinal cross sectional view of another example of the fourth embodiment.

The magnetic recording medium B is made, as illustrated in FIG. 19, of a holding substrate material 90 and a peeling layer 91 formed thereon, and the protective covering layer 93 is formed on top of the peeling layer 91.

The holding substrate material 90 used in this embodiment is made of a polyester film of thickness of 5 to 500 $\mu$m, for example. The peeling layer 91 can be selected from silicone group resins, fluorinated group resins, acrylic group resins, cellulose group resins, urethane group resins, epoxy group resins, vinyl chloride•vinyl acetate copolymers used singly or mixed.

Next, a magnetic coating containing magnetic particles and binder so as to generate a coercive force of 250–5,000 oersted is applied on top of the protective covering layer 93, then the solvent in the coating mixture is vaporized and the magnetic coating is dried to produce a stock sheet having the second magnetic layer 95. In this case, magnetic orientation treatment may be applied to the second magnetic layer 95 while the magnetic coating is still undried.

Next, magnetic information is recorded on the second magnetic layer 95 produced by the above step. The recording can be performed from the front or the back surface of the second magnetic layer 95 using an ordinary magnetic head following a usual magnetic recording procedure. In this case, the recording magnetic head may comprise a plurality of magnetic head members to suit the total width of the stock sheet or it may comprise one magnetic head having a magnetic core of a width to correspond with the sheet width.

The result of the above recording is a reversing magnetic polarity pattern in the second magnetic layer 95 as shown in FIG. 19. This step is followed by a step of forming the first magnetic layer 96 on top of the second magnetic layer 95. The first magnetic layer 96 comprises a coating made by mixing magnetic particles having a coercive force of less than 100 oersted and the binder. While the solvent is present in the magnetic coating, the magnetic particles in the first magnetic layer 96 will collect at the locations of strong magnetic force, that is, the boundaries 97 of reversing magnetic polarities, and form a plurality of protrusions 96a, as shown in FIG. 19, to correspond with the patterns of magnetic recording made in the second magnetic layer 95. When the first magnetic layer 95 is dried, a bar-code type of patterns serving as identifier coding information is formed in the first magnetic layer 96.

Finally, an adhesive layer 98 is formed on top of the first magnetic layer 96, thus producing a stock sheet for magnetic tape. The tape is slit into narrow strips to produce magnetic transfer tapes 99 of the fourth embodiment.

Next, the tape 99 is attached to a non-magnetic base material 81 as shown in FIG. 19, and the holding substrate material 90 and the peeling layer 91 are peeled off to produce the magnetic recording medium B shown in FIG. 17 (B). In this case, the second magnetic layer 95, the first magnetic layer 96 and the protective covering layer 93 shown in FIG. 19 correspond, respectively, to the second magnetic layer 86, the first magnetic layer 85 and the protective covering layer 87 shown in FIG. 17 (B).

Also, it is possible to make the recording medium A by applying a heat processing treatment such as hot rolling to the recording medium B.

For the second magnetic layer 86 in the magnetic recording media A and B, re-recording is possible with an ordinary magnetic head, thus making it possible to use this type of recording medium for ordinary applications. The magnetic information recorded at the time of manufacturing of the second magnetic layer 86 can be erased with DC- or AC-demagnetization techniques prior to the use, but if the old information is left in the recording medium, it will not interfere with proper writing of new information, as the new information writes over the old information.

The magnetic information inputted in the first magnetic layer 85 can be read with a magnetic head with an external biasing magnetic field so as to generate reproduction signals.

Further advantage of the recording media A, B is that since the bar-code-type patterns serving as the coding information are protrusions 85a disposed on the bottom surface of the first magnetic layer 85, and the protrusion 85a are embedded in the adhesive layer 84 facing the base material, the protrusions 85a do not appear on the surface of the stripe member 82. Therefore, it is impossible to detect the presence of the bar-code-type magnetic patterns by examining from outside. Therefore, the recording media A, B are provided with invisible magnetic identifier coding information beneath the second magnetic layer 86 which can be magnetically recorded in the usual way.

In addition, the protrusions 85a are formed during the process of applying the first magnetic layer while the magnetic particles are still mobile in the undried coating mixture (before the solvent is vaporized). Therefore, after the solvent is vaporized and the magnetic particles are fixated, the magnetic information recorded in the first magnetic layer becomes fixated coding information which can neither be erased or altered subsequently to the formation of the first magnetic layer.

Furthermore, the magnetic information on the first magnetic layer 85 can be freely selected by freely selecting the recording pattern at the time of making the second magnetic layer 86.

In other words, a pattern can be repeated many times by such fixed reproduction method as printing, or random patterns which would not be possible by the fixed method may be recorded. Such random information is useful as finger print data by providing individual identifier coding to the final product, such as consumer credit card. This means that it becomes impossible to make a counterfeit card by duplicating the magnetic information on some magnetic card on another magnetic card. Therefore, the method enables to present the recording media A, B which are tamper-proof and counterfeit-proof.

Further, in the above embodiment, magnetic information was recorded internally in the second magnetic layer 86; however, for some types of magnetic layer, magnetic information can be recorded by vertical magnetization. Therefore, the identifier coding information can be inputted in the first magnetic layer 85 by recording the coding information by perpendicular recording in the second magnetic layer 86.

In the following, a fifth embodiment will be presented with reference to the drawings.

Figure 20:
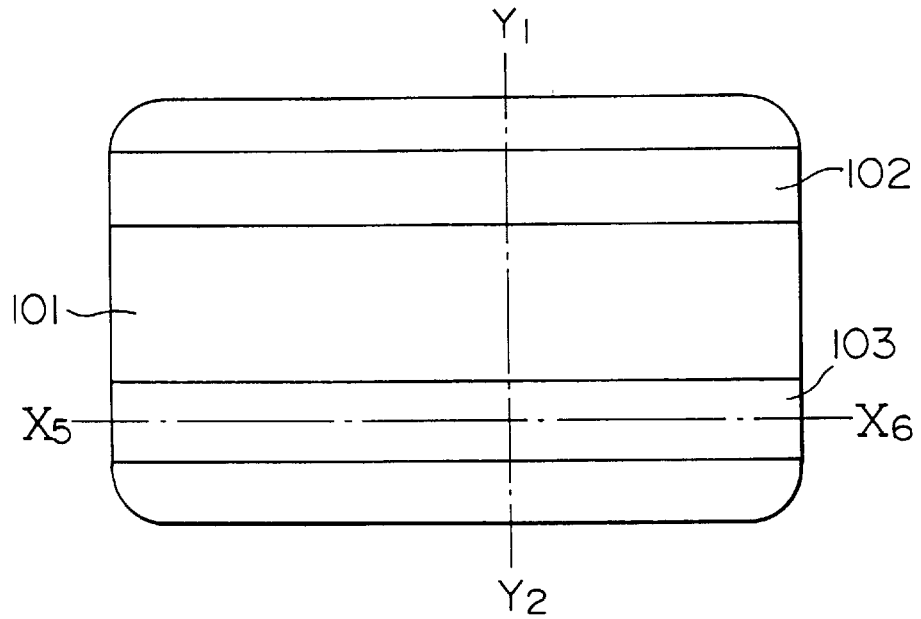
FIG. 20 is a plan view of a fifth embodiment of the magnetic recording medium.
Figure 21A:
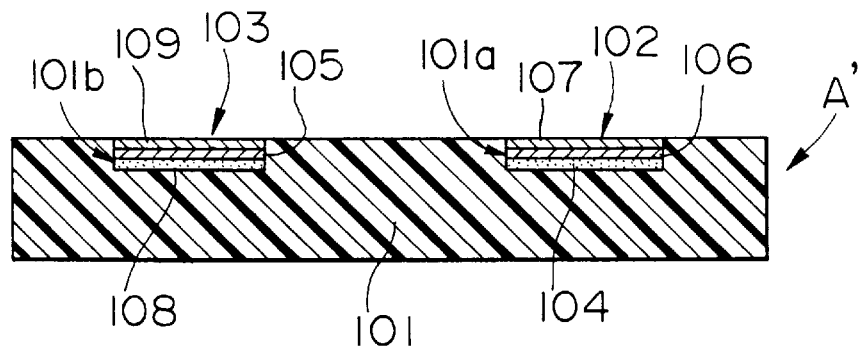
FIG. 21 (A) is a transverse cross sectional view of the magnetic recording medium along the line $Y_1$–$Y_2$ shown in FIG. 16.
Figure 21B:
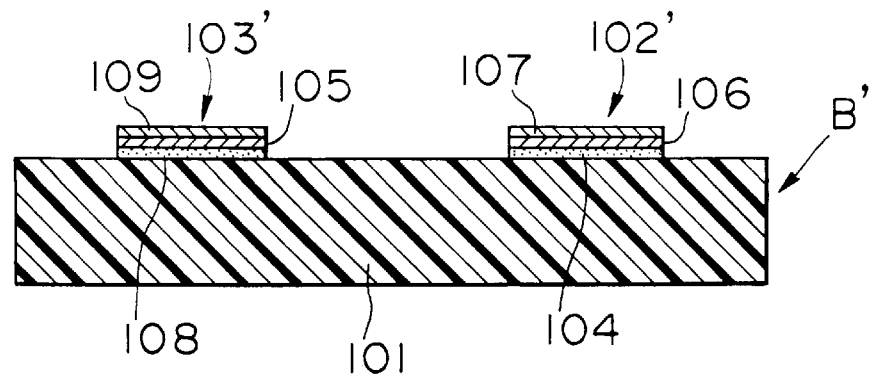

FIG. 20 is an example of the magnetic recording medium of the fifth embodiment. The recording medium A' comprises: a base material 101 of a card type; a regular stripe 102 for recording regular magnetic information disposed longitudinally on one side of the card; an coding stripe 103 for recording magnetic identifier coding, spaced from and disposed parallel to the regular stripe 102. FIG. 21 (A) is a transverse cross sectional view taken at the line $Y_1$–$Y_2$ in FIG. 20, and shows that the regular stripe 102 is embedded in a groove 101a of the base material 101 at one side, and the coding stripe 103 is embedded in a groove 101b of the base material 101 at the opposing side.

The regular stripe 102 comprises: an adhesive layer 104 disposed adjacent to the bottom of the groove 101a; a first magnetic layer 106; and a protective covering layer 107, successively disposed on top of the other. The coding stripe 103 comprises: an adhesive layer 108 disposed adjacent to the bottom of the groove 101b; a second magnetic layer 105; and a protective covering layer 109.

The protective covering layers 107, 109 are for the purpose of providing protection to the surface of the magnetic layers 105, 106, and may be eliminated if appropriate. It is also permissible to provide a coloring layer or a vapor-deposited metallic layer, as necessary. between the first magnetic layer 106 and the protective covering layer 107 or between the second magnetic layer 105 and the protective covering layer 109. In this example of recording medium A', the adhesive layer 104, the first magnetic layer 106 and the protective covering layer 107 are thermally bonded and embedded in the groove 101a, and the adhesive layer 108, the second magnetic layer 105 and the protective covering layer 109 are thermally bonded and embedded in the groove 101b so as to form a unit body of the recording medium A'.

It is also permissible to arrange the stripes as shown in FIG. 21 (B) on the top surface of a magnetic recording medium B'. A regular stripe 102' comprises: a base material 101'; an adhesive layer 104; a first magnetic layer 106 and a protective covering layer 107. A coding stripe 103' comprises: an adhesive layer 108; a second magnetic layer 105 and a protective covering layer 109.

The base materials 101, 101' and the adhesive layer 104 can be made of the same type of material as mentioned in the previous embodiments.

The first magnetic layer 106 is made by dispersing, in a binder, magnetic particles having a coercive force of over 250 oersted, for example, between 250–5,000 oersted. The magnetic particles may be selected suitably from γ-iron oxide having a coercive force of 250–400 oersted; cobalt-clad γ-iron oxide of 600–700 oersted; barium ferrite (BaO—6Fe$_2$O$_3$) of 1,600–1,900 oersted or 2,500–3,000 oersted. It is, of course, permissible to use known magnetic powder particles such as chromium oxide and strontium ferrite.

The second magnetic layer 105 comprises a binder in which magnetic powder particles having a coercive force of less than 100 oersted are dispersed therein. The magnetic particles may be selected from powders of carbonyl iron powder, zinc ferrite, manganese zinc ferrite, nickel, magnetite, Permalloy (Ni—Fe), Sendust (Fe—Si—Al), and Alperm (Fe—Al).

The binder for use in dispersing the magnetic particles and anchoring them in the first magnetic layer 106 and the second magnetic layer 105 may be selected from vinyl chloride•vinyl acetate group copolymers, polyurethane group resins, polyester group resins, epoxy group resins, with a small amount of an additive such as pigment. Other known binders for magnetic particles may also be used. In addition, the additive may be selected from inorganic materials such as silica, alumina or organic materials such as wax and silicone oil.

Figure 22:
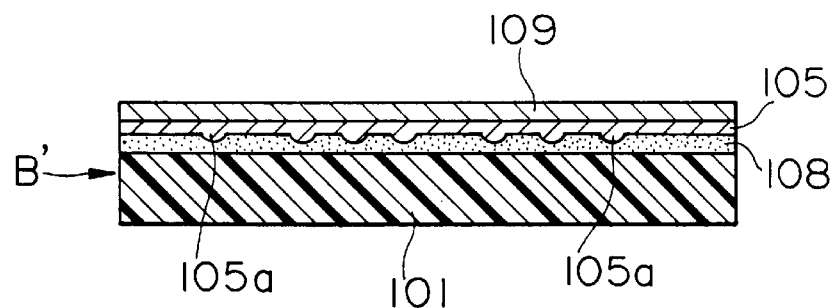
FIG. 22 is a magnified view of the longitudinal cross section of the magnetic recording medium at the line $X_5$–$X_6$ shown in FIG. 20.

The bottom surface of the second magnetic layer 105 is provided with a plurality of uniformly spaced protrusions 105a disposed transversely to the longitudinal direction of the stripe as shown in FIG. 22. These protrusions 105a are formed by the magnetic particles and the binder in the second magnetic layer 105 collecting in such a way to form the protrusions. The magnetic particles collect densely at and near the protrusions 105a. Accordingly, the bottom surface of the second magnetic layer 105 is provided with a type of magnetic patterns formed by the protrusions 105a.

The protective covering layer 107 can be made from the same materials as mentioned in the previous embodiments.

FIG. 22 is a longitudinal cross sectional view taken along the line X$_5$–X$_6$ shown in FIG. 20, showing that the base material 101 is successively overlaid with the adhesive layer 108, the second magnetic layer 105 and the protective covering layer 109.

Next, an example of the manufacturing method of the fifth embodiment will be explained.

This method is based on making a transfer tape first, followed by making a magnetic recording medium B'.

Figure 23:
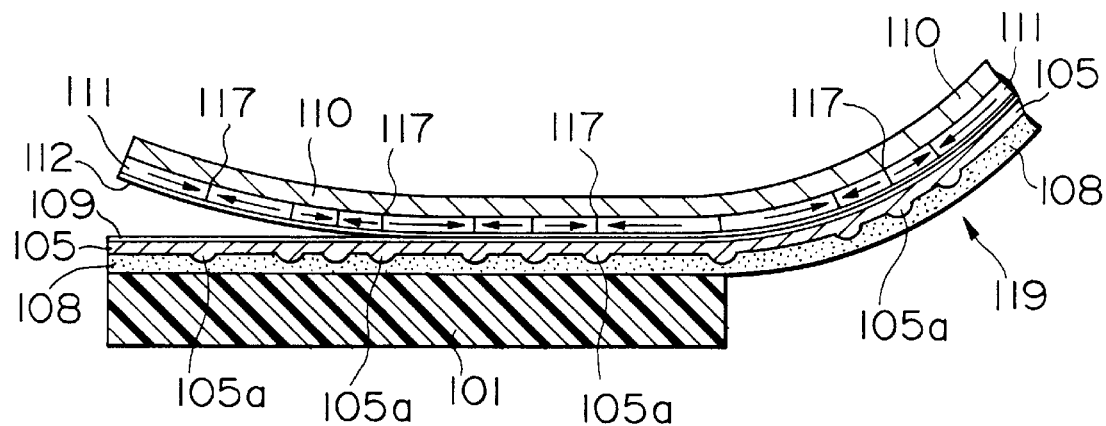
FIG. 23 is a longitudinal cross sectional view of a transfer tape according to the fifth embodiment.

To make the recording medium B', a non-magnetic holding substrate member 110 shown in FIG. 23 is used.

In this case, the holding substrate member 110 is, for example, a polyester film of 5 to 500 μm thickness.

The holding substrate material 110 is coated with a coating mixture containing a binder and magnetic particles having a coercive force between 250 to 5,000 oersted, and the solvent in the coating mixture is evaporated to dry the coating to produce a stock sheet having the transfer magnetic layer 111. In this case, magnetic orientation processing can be carried out on the transfer magnetic layer 111 while the magnetic coating material is still undried.

Next, magnetic information is inputted on the transfer magnetic layer 111 produced by the above step. The recording can be performed from the front or the back surface of the transfer magnetic layer 111 using an ordinary magnetic head following a usual magnetic recording procedure. In this case, the recording magnetic head may comprise a plurality of magnetic head members to suit the total width of the stock sheet or it may comprise one magnetic head having a magnetic core of a width to correspond with the sheet width.

The result of the recording is the formation of reversing magnetic polarity patterns on the transfer magnetic layer 111 as shown in FIG. 23.

Next, a peeling layer 112 is formed on top of the transfer magnetic layer 111, followed by the formation of a protective covering layer 109.

The peeling layer 112 can be selected from silicone group resins, fluorinated group resins, acrylic group resins, cellulose group of resins, polyurethane group resins, polyester group resins, epoxy group resins, vinyl chloride group resins, vinyl chloride•vinyl acetate copolymer group resins, singly or in combination.

Next, the second magnetic layer 105 is formed on top of the protective covering layer 109. The second magnetic layer 105 is formed on top of the protective covering layer 109 by coating with a coating mixture made by mixing magnetic particles having a coercive force of less than 100 oersted and the binder. While the solvent is still present in the magnetic coating, the magnetic particles in the second magnetic layer 105 will collect at the locations of strong magnetic force, that is, the boundaries 117 of reversing magnetic polarities, and form a plurality of protrusions 105a, as shown in FIG. 23, to correspond with the patterns of magnetic recording made in the transfer magnetic layer 111. When the second magnetic layer 105 is dried, a barcode type patterns serving as identifier coding information is formed in the second magnetic layer 105.

Lastly, the adhesive layer 108 is formed on top of the second magnetic layer 105 so as to produce a stock sheet, which is slitted into narrow tapes 119 of desired widths.

Next, the transfer magnetic tape 119 is attached to the base material 101, and subsequently, the holding substrate material 110, the transfer magnetic layer 111 and the peeling layer 112 are removed, as shown in FIG. 23 to produce the coding stripe 103' comprising the base material 101, adhesive layer 108 and the second magnetic layer 105 as shown in FIG. 21 (B).

Here, the regular stripe 102' can be produced with the ordinary technique of producing magnetic recording tapes, so the explanation will be omitted. The recording medium B' shown in FIG. 21 (B) can now be made by attaching the coding stripe 103' and the regular stripe 102' on the base material 101.

The magnetic recording media of this embodiment comprises at least one second magnetic layer on top of a non-magnetic base material, and this second magnetic layer contains the identifier coding information. However, in the recording media A' and B' shown in FIG. 21, the coding stripes 103 and 103' provide the necessary function of carrying the identifier coding information.

Because the coding stripes 103, 103' are for use in carrying the fixated information, if it is necessary to use the recording media A', B' for regular magnetic recording purposes, it is necessary to form a regular magnetic track having a coercive force between 250 to 5,000 oersted on the same base material 101. The magnetic track in such a case can be laid on the same surface as any one of the stripes 102, 102' or 103, 103' which were shown in FIG. 21. The track can also be located on the opposite surface of the base material 101. The regular magnetic track can be disposed as a stripe as shown in FIGS. 20 and 21, or can be disposed on the entire surface of the base material 101.

When regular magnetic recording is not necessary, the base material may contain only the coding layer. In this case, the magnetically recorded information indicates the fixated coding information, and the fixated information acts as "read only memory" (ROM).

In the recording media A', B', since the bar-code-type patterns serving as coding information is represented by protrusions 105*a* embedded in the adhesive layer 108 and facing the base material, the protrusion 105*a* do not appear on the surface of the stripe member 103, 103'. Therefore, it is impossible to detect the presence of the bar-code-type magnetic patterns by examining from outside. Therefore, the recording media A', B' are provided with invisible magnetic identifier coding information.

Furthermore, because the protrusions 105*a* are formed while the magnetic coating in forming the second magnetic layer 105 is undried, and the magnetic particles therein are still mobile. Therefore, after the solvent is evaporated, and the magnetic particles become immobile in the second magnetic layer 105, the magnetic information, derived from the localized regions of different concentrations of the magnetic particles, becomes fixated information which can neither be erased or altered.

Furthermore, the magnetic information on the second magnetic layer 105, can be selected freely by selecting a magnetic pattern to be recorded on the transfer magnetic layer 111. Such information is useful as finger print data by providing individual identifier coding to the final product, such as consumer credit card. This means that it becomes impossible to make a counterfeit card by duplicating the magnetic information on some magnetic card on another magnetic card. Therefore, the method enables to present the recording media A', B' which are tamper-proof and counterfeit-proof.

Further, in the above embodiment, magnetic information was recorded internally in the second magnetic layer 86; however, for some types of magnetic layer, magnetic information can be recorded by vertical magnetization. Therefore, the identifier coding information can be inputted in the transfer magnetic layer 111 by recording the coding information by perpendicular recording in the second magnetic layer 105.

EXPERIMENTAL EXAMPLES

In the following sections, various experimental examples the embodiments presented above will be demonstrated by means of some experimental examples. The compositions are all given in weight percentage. Experimental Examples 1 of the first embodiment follows.

Experimental Example 1

A magnetic coating (liquid) mixture containing magnetic particles having a low coercive force was prepared by blending the following ingredients in the proportion shown below.
Carbonyl iron powder
(coercive force 10 oersted;

| | |
|---|---|
| specific surface area 1 m²/g) | 100 weight parts |
| Carbon black | 3 weight parts |

-continued

| | |
|---|---|
| Lecithin | 20 weight parts |
| Vinyl chloride.vinyl acetate. vinyl alcohol copolymer | 20 weight parts |
| Polyurethane resin | 20 weight parts |
| Toluene | 60 weight parts |
| Methyethylkeytone | 60 weight parts |
| Methyisobutylketone | 60 weight parts |

After blending the above coating mixture in a ball mill for eight hours, five parts by weight of polyisocyanate resin was added and the mixture was further blended for one hour to produce a low-coercivity coating mixture.

Next, using the method illustrated in FIG. 4, one side of a polyester film base material was coated with the coating mixture, and the coated surface was processed magnetically using the magnetic encoding device 15 similar to the one shown in FIG. 6 disposed before the dryer.

The magnetic head was impressed with current pulses similar to the one shown in FIG. 9. The pulse density impressed was chosen so as to produce bar-code type signals at FM recording pulses of 100 BPI. The low-coercivity layer was still undried when the magnetic processing was carried out, and the result was that bar-code type patterns were formed in the coating mixture.

Next, when the low-coercivity magnetic layer was dried in the dryer 16, the bar-code type patterns became immobilized and fixated in the magnetic layer. From the stock sheet thus produced, test cards of a JIS size (54×84 mm) having the longitudinal cross section as shown in FIG. 1 were punched out. The cards were tested as follows.

The section having the bar-code type patterns was read with a magnetic read head under a DC biasing magnetic field at 500 gauss. The resulting signal was in conformity with the bar-code type patterns as shown by an example of the bar-code-type pattern shown in FIG. 25.

Experimental Example 2

A magnetic coating (liquid) mixture containing magnetic particles having a high coercive force was prepared by blending the following ingredients in the proportion shown below.
Barium ferrite powder (BaO•6Fe₂O₃)
(coercive force 2750 oersted;

| | |
|---|---|
| Specific surface area 8 m²/g) | 100 weight parts |
| Carbon black | 3 weight parts |
| Lecithin | 1 weight parts |
| Vinyl chloride.vinyl acetate. vinyl alcohol copolymer | 20 weight parts |
| Polyurethane resin | 20 weight parts |
| Toluene | 60 weight parts |
| Methyethylkeytone | 60 weight parts |
| Methyisobutylketone | 60 weight parts | vinyl chloride·vinyl acetate·

| | |
|---|---|
| vinyl alcohol copolymer | 20 weight parts |
| Polyurethane resin | 20 weight parts |
| Toluene | 60 weight parts |
| Methyethylkeytone | 60 weight parts |
| Methyiobutylketone | 60 weight parts |

After blending the above coating mixture in a ball mill for eight hours, five parts by weight of polyisocyanate resin was added and the mixture was further blended for one hour to produce a coating mixture. The coating mixture was applied on a polyester film base material in the usual way of making magnetic recording medium.

Next, a coating mixture containing low-coercivity magnetic particles was prepared according to the following proportion.

| | |
|---|---|
| MnZn ferrite powder (coercivity 25 oersted specific surface area 10 m²/g) | 100 weight parts |
| Carbon black | 3 weight parts |
| Lecithin | 1 weight parts |
| Vinyl chloride.vinyl acetate. vinyl alcohol copolymer | 20 weight parts |
| Polyurethane resin | 20 weight parts |
| Toluene | 60 weight parts |
| Methyethylkeytone | 60 weight parts |
| Methyisobutylketone | 60 weight parts |

After blending the above coating mixture in a ball mill for eight hours, five parts by weight of polyisocyanate resin was added and the mixture was further blended for one hour to produce a coating mixture of low-coercivity. The coating mixture was applied on the magnetic layer produced above according to the method shown in FIG. 4.

In this case, the magnetic encoding device 15 was a roll-type permanent magnet 3b similar to the one shown in FIG. 7, and the bar-code-type patterns were produced. The magnetic layer was dried and the pattern was fixated. When the low-coercivity magnetic layer was dried in the dryer 16, the bar-code type patterns became immobilized and were fixated in the magnetic layer. Test cards of a JIS size (54×84 mm) having the longitudinal cross section as shown in FIG. 2 were punched out. The cards were tested as follows.

The section having the bar-code type patterns was read with a magnetic read head under a DC biasing magnetic field at 500 gauss. The resulting signal was in conformity with the bar-code type patterns.

The region of the card other than the coded region was subjected to recording tests at FM recording at 100 BPI recording density using a regular recording head capable of writing in magnetic layer of up to 3,000 oersted force. The results demonstrated that regular recording and erasure operations were possible as in ordinary magnetic cards.

Experimental Example 3

A magnetic coating mixture having a low coercive force was prepared by blending the following ingredients in the proportion shown below.
Permalloy powder
(coercive force 0.006 oersted;

| | |
|---|---|
| specific surface area 1 m²/g) | 100 weight parts |
| Carbon black | 3 weight parts |
| Lecithin | 1 weight parts |
| Vinyl chloride.vinyl acetate. vinyl alcohol copolymer | 20 weight parts |
| Polyurethane resin | 20 weight parts |
| Toluene | 60 weight parts |
| Methyethylkeytone | 60 weight parts |
| Methyisobutylketone | 60 weight parts |

After blending the above coating mixture in a ball mill for eight hours, five parts by weight of polyisocyanate resin was added and the mixture was further blended for one hour to produce a coating mixture.

Next, using the apparatus shown in FIG. 4, the mixture was applied to the base material of polyester film, and encoded the wet coating, in which the magnetic particles are mobile, with the magnetic encoding device 15 from the back surface of the coating mixture, as shown in FIG. 8. The device 15 was made by attaching numeral impressions made of rubber magnet on an aluminum roll.

By contacting the back surface of the coating with the roll, patterns made of these numerals were formed in the low-coercivity magnetic layer of a stock sheet. When this layer was dried, the patterns were fixated in the low-coercivity magnetic layer.

Next, the mixture obtained in the second embodiment was applied on top of the low-coercivity magnetic layer of the stock sheet. The coating is performed using the ordinary process of forming magnetic tapes.

From the stock sheet thus produced, test cards of a JIS size (54×84 mm) having the longitudinal cross section as shown in FIG. 3 were punched out. The cards were tested as follows.

The section having the numeric type patterns was read with a magnetic read head under a DC biasing magnetic field at 500 gauss. The resulting signal was in conformity with the numeric patterns.

The region of the card other than the coded region was subjected to recording tests at FM recording at 100 BPI recording density using a regular recording head capable of writing in magnetic layer of up to 3,000 oersted force. It was possible to perform regular recording and erasure operations, indicating that the cards can be used as regular magnetic cards.

The following experimental examples are based on the second embodiment of the present invention.

Experimental Example 4

The first magnetic layer was made in the following blending ratio.
Barium ferrite powder (BaO•6Fe$_2$O$_3$)
(coercive force 2750 oersted;

| | |
|---|---|
| Specific surface area 8 m²/g) | 100 weight parts |
| Carbon black | 3 weight parts |
| Lecithin | 1 weight parts |
| Vinyl chloride.vinyl acetate. vinyl alcohol copolymer | 20 weight parts |
| Polyurethane resin | 20 weight parts |
| Toluene | 60 weight parts |
| Methyethylkeytone | 60 weight parts |
| Methylisobutylketone | 60 weight parts |

After blending the above coating mixture in a ball mill for eight hours, five parts by weight of polyisocyanate resin was added and the mixture was further blended for one hour to produce a coating mixture for a first magnetic layer. The coating procedure was the regular one used for making magnetic recording medium. That is, as shown in FIG. 11, coating a white polyester film of 188 μm thickness with the coating mixture, and before the coating is dry, applying magnetic orientation processing, and drying the film in the dryer to form a magnetic layer of 12 μm thickness, and the sheet is rolled up as a stock sheet.

Next, a coating mixture for a second magnetic layer was prepared by mixing the ingredients in the following proportion.
Strontium ferrite powder (SrO•6Fe$_2$O$_3$)
(coercive force 8,000 oersted;

| | |
|---|---|
| Specific surface area 5 m²/g) | 100 weight parts |
| Carbon black | 3 weight parts |
| Lecithin | 1 weight parts |

Vinyl chloride•vinyl acetate•

| | |
|---|---|
| vinyl alcohol copolymer | 20 weight parts |
| Polyurethane resin | 20 weight parts |
| Toluene | 60 weight parts |
| Methyethylkeytone | 60 weight parts |
| Isophorone | 60 weight parts |

After blending the above coating mixture in a ball mill for eight hours, five parts by weight of polyisocyanate resin was added and the mixture was further blended for one hour to produce a coating mixture for the second magnetic layer. The coating procedure was to overlay the second coating on the first magnetic layer in the same way as in the coating process for the first magnetic layer. However, magnetic orientation processing is carried out on the first magnetic layer as shown in FIG. 12, before the second coating is applied.

Magnetic recording was performed with a a magnetic recording head having a 50 µm gap, using pulsed recording current at a force to sufficiently saturate the first magnetic layer. The recording method was FM recording at 100 BPI. Next, as shown in FIG. 12, the second coating mixture was applied, followed by drying the coating in the dryer to make the second magnetic layer of 6 µm thickness to produce the recording medium of the present invention. The recording medium was made into cards conforming to the JIS (54×84 mm), and the cards were evaluated as follows.

As shown in FIG. 10 (A), magnetic recordings were made on the first magnetic layer at the time of coating the first magnetic layer. This was followed by the formation of the second magnetic layer as shown in FIG. 10 (B), and after the track $T_1$ was DC-erased at a coercive force suitable for a magnetic layer of 2750 oersted which is sufficient to saturate the track $T_1$, the magnetic information was read with a read magnetic head.

Figure 24:
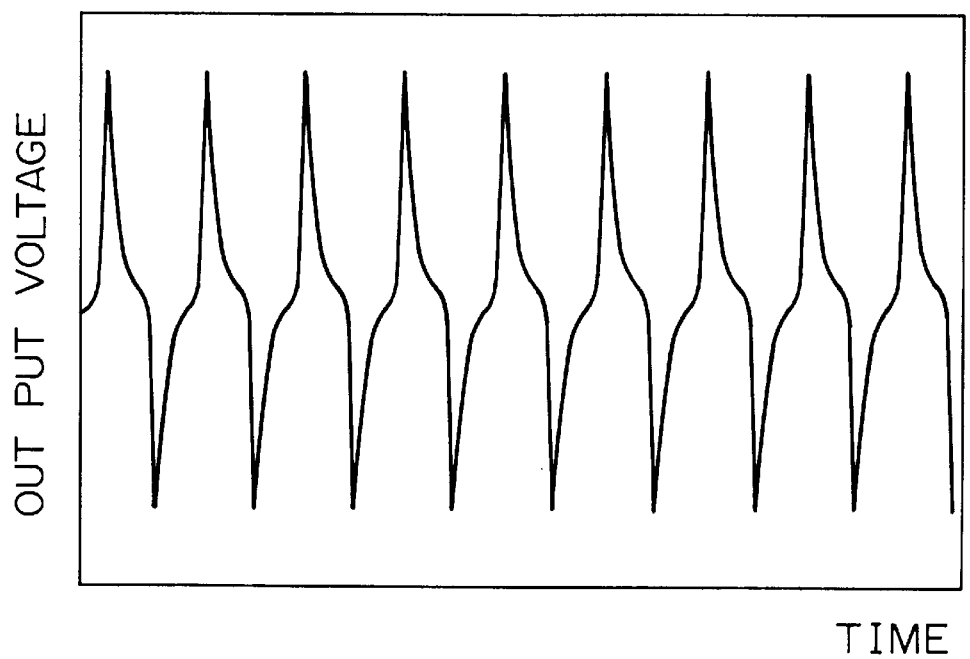
FIG. 24 is an example of the bar-code-type patterns produced in experimental example 4 observed under direct current biasing magnetic field.

The result was that the magnetic information on the first magnetic layer was erased as shown in FIG. 10 (C), but the information on the first magnetic layer was transferred to the magnetic layer having the coercive force of 8000 oersted and was fixated thereon, thus permitting this information to be read. This information was not able to be erased with a magnetic head capable of recording on a magnetic layer of 2,750 oersted force. An example of the bar-type coding pattern obtained is shown in FIG. 24.

On the regions of the card other than the track $T_1$, magnetic recordings were made using the magnetic head capable of recording on a magnetic layer of 4,000 oersted coercive force was used to FM record at 100 BPI. It was possible to carry out normal recording and reproduction, i.e. the cards were useable as ordinary magnetic cards.

Experimental Example 5

The first magnetic layer was made in the following blending ratio.
Barium ferrite powder (BaO•6Fe₂O₃)
(coercive force 2750 oersted;

| | |
|---|---|
| Specific surface area 8 m²/g) | 100 weight parts |
| Carbon black | 3 weight parts |
| Lecithin | 1 weight parts |

Vinyl chloride•vinyl acetate•

| | |
|---|---|
| vinyl alcohol copolymer | 20 weight parts |
| Polyurethane resin | 20 weight parts |
| Toluene | 60 weight parts |
| Methyethylkeytone | 60 weight parts |
| Methyisobutylketone | 60 weight parts |

After blending the above coating mixture in a ball mill for eight hours, five parts by weight of polyisocyanate resin was added and the mixture was further blended for one hour to produce a coating mixture for a first magnetic layer. The coating method was the normal method for making magnetic recording medium.

That is, as shown in FIG. 11, a white polyester film of 188 µm was used as the base material, and the film was coated with the above mixture, was magnetically oriented while wet, while the magnetic particles are mobile, dried in the dryer to produce a magnetic layer of 12 µm thickness to make a stock sheet.

The magnetic stock sheet was magnetically recorded using a magnetic recording device. The recording process was performed using a magnetic head of 50 µm head gap at the recording pulsed current which is sufficient to saturate the first magnetic layer. The method was FM recording at 100 BPI.

On top of the pre-recorded magnetic stock sheet thus produced, a second magnetic layer was applied by screen printing.

The coating mixture for the second magnetic layer had the following blending ratio.
Strontium ferrite powder (SrO•6Fe₂O₃)
(coercive force 8,000 oersted;

| | |
|---|---|
| Specific surface area 5 m²/g) | 100 weight parts |
| Carbon black | 3 weight parts |
| Lecithin | 1 weight parts |

Vinyl chloride•vinyl acetate•

| | |
|---|---|
| vinyl alcohol copolymer | 20 weight parts |
| Polyurethane resin | 20 weight parts |
| Toluene | 60 weight parts |
| Methyethylkeytone | 60 weight parts |
| Isophorone | 60 weight parts |

After blending the above coating mixture in a ball mill for eight hours, five parts by weight of polyisocyanate resin was added and the mixture was further blended for one hour to produce a screen printing mixture for the second magnetic layer.

The screen printing ink thus obtained was used to form the screen printed (coding) layer on the first magnetic layer on the stock sheet which has been magnetically pre-recorded, and it was dried to make the second magnetic layer of 6 µm thickness (to become a coding layer) to produce the magnetic recording medium of the present invention.

The recording medium was punched out to produce JIS size (54×84 mm) magnetic cards, and the cards were evaluated according to the following methods.

That is, the regions forming the second magnetic layer was DC-erased at a saturation magnetic field suitable for the 2,750 oersted layer, and the magnetic information was read with a magnetic read head. The information on the first magnetic layer was erased, but the information from the first magnetic layer was transferred and fixated in the 8,000 oersted (coding) layer, and it was possible to read this information.

This information was not able to be erased with a magnetic head capable of recording on a a magnetic layer of 4,000 oersted force.

On the regions of the card other than the track $T_2$, magnetic recordings were made using the magnetic head capable of recording on a magnetic layer of 4,000 oersted was used to FM record at 100 BPI. It was possible to carry out normal recording and reproduction, i.e. the cards were useable as ordinary magnetic cards.

In the following, experimental examples of the third embodiment of the invention will be presented.

Experimental Example 6

The first magnetic layer was produced at the following blending ratio.
Barium ferrite powder ($BaO \cdot 6Fe_2O_3$)
(coercive force 2750 oersted;

| Specific surface area 8 m²/g) | 100 weight parts |
|---|---|
| Carbon black | 3 weight parts |
| Lecithin | 1 weight parts |

Vinyl chloride•vinyl acetate•

| vinyl alcohol copolymer | 20 weight parts |
|---|---|
| Polyurethane resin | 20 weight parts |
| Toluene | 60 weight parts |
| Methyethylkeytone | 60 weight parts |
| Methyisobutylketone | 60 weight parts |

After blending the above coating mixture in a ball mill for eight hours, five parts by weight of polyisocyanate resin was added and the mixture was further blended for one hour to produce a coating mixture for a first magnetic layer. The coating method was the normal method for making magnetic recording medium.

That is, as shown in FIG. 14, a white polyester film of 188 μm was used as the base material, and the film was coated with the above mixture, was magnetically oriented while wet, dried in the dryer to produce a magnetic layer of 12 μm thickness to make a stock sheet.

The coating mixture for a second magnetic layer had the following blending ratio.
Carbonyl iron powder
(coercive force 10 oersted;

| Specific surface area 1 m²/g) | 100 weight parts |
|---|---|
| Carbon black | 3 weight parts |
| Lecithin | 1 weight parts |

Vinyl chloride•vinyl acetate•

| vinyl alcohol copolymer | 20 weight parts |
|---|---|
| Polyurethane resin | 20 weight parts |
| Toluene | 60 weight parts |
| Methyethylkeytone | 60 weight parts |
| Methyisobutylketone | 60 weight parts |

After blending the above coating mixture in a ball mill for eight hours, five parts by weight of polyisocyanate resin was added and the mixture was further blended for one hour to produce a coating mixture for a second magnetic layer.

The stock sheet having the first magnetic layer was coated with the second magnetic layer in the same way as the coating process for first magnetic layer. However, as shown in FIG. 15, before forming the second magnetic layer, magnetic recording is performed using a magnetic head 20 having a head gap of 50 μm at a pulsed current sufficient to saturate the first magnetic layer. The method was FM recording at 100 BPI.

Next, as shown in FIG. 15, coating was applied in the coating section to produce a second magnetic layer, the coating was dried to form the second magnetic layer of 6 μm thickness to serve as the coding layer, and the stock sheet was picked up. Cards of JIS size (54×84 mm) were punched out from the stock sheet, and were evaluated as follows.

Figure 25:
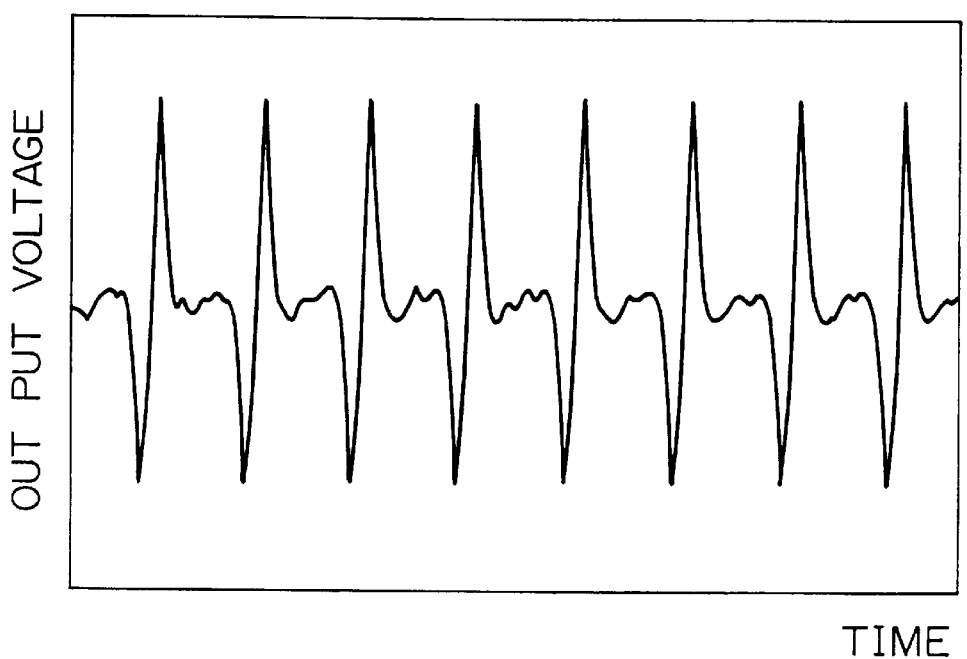
FIG. 25 is an example of the bar-code-type patterns produced in experimental examples 1, 6, 11 and 12 observed under direct current biasing magnetic field.

That is, the regions where the second magnetic layer is formed, as shown in FIG. 13 (A), was DC-erased at a magnetic force suitable for the 3,000 oersted magnetic layer. The region was read with a magnetic read head under a 500 gauss biasing magnetic field. It was found that the information on the first magnetic layer was erased, but the information from the first magnetic layer was transferred and fixated in the second magnetic layer thus serving as the coding layer, and it was possible to read this information. An example of the signals from the bar-code-type patterns obtained is shown in FIG. 25.

On the regions of the card other than the track $T_2$, magnetic recordings were made using the magnetic head capable of recording on a magnetic layer of 3,000 oersted by FM recording at 100 BPI. It was possible to carry out normal recording and reproduction, i.e. the cards were useable as ordinary magnetic cards.

Experimental Example 7

Except for the first magnetic layer which was made using the coating mixture of the following blending ratio, the conditions for making the magnetic recording medium were the same as in Example 6.
-iron oxide powder
(coercive force 300 oersted;

| Specific surface area 20 m²/g) | 100 weight parts |
|---|---|
| Carbon black | 3 weight parts |
| Lecithin | 1 weight parts |

Vinyl chloride•vinyl acetate•

| vinyl alcohol copolymer | 20 weight parts |
|---|---|
| Polyurethane resin | 20 weight parts |
| Toluene | 60 weight parts |
| Methyethylkeytone | 60 weight parts |
| Methyisobutylketone | 60 weight parts |

From the stock sheet thus produced, JIS size cards (54×84 mm) were punched out, and evaluated in the same way as in Example 6. The results similar to Experiment 6 were obtained.

On the regions of the card other than the track $T_2$, magnetic recordings were made using the magnetic head capable of recording on a magnetic layer of 3,000 oersted was used to FM record at 100 BPI. It was possible to carry out normal recording and reproduction, i.e. the cards were useable as ordinary magnetic cards.

Experimental Example 8

The coating mixture for the first magnetic layer was made in the following blending ratio.
Barium ferrite powder (BaO•6Fe$_2$O$_3$)
(coercive force 2750 oersted;

| Specific surface area 8 m$^2$/g) | 100 weight parts |
|---|---|
| Carbon black | 3 weight parts |
| Lecithin | 1 weight parts |

Vinyl chloride•vinyl acetate•

| vinyl alcohol copolymer | 20 weight parts |
|---|---|
| Polyurethane resin | 20 weight parts |
| Toluene | 60 weight parts |
| Methyethylkeytone | 60 weight parts |
| Methyisobutylketone | 60 weight parts |

After blending the above coating mixture in a ball mill for eight hours, five parts by weight of polyisocyanate resin was added and the mixture was further blended for one hour to produce a coating mixture for a first magnetic layer.

That is, as shown in FIG. 14, a white polyester film of 188 $\mu$m was used as the base material, and the film was coated with the above first coating mixture, was magnetically oriented while wet, dried in the dryer to produce a magnetic layer of 12 $\mu$m thickness to make a stock sheet.

The stock sheet was subjected to recording using a magnetic recording device. That is, recordings were made using a recording head having a 50 $\mu$m head gap at a pulsed current sufficient to saturate the first magnetic layer. The recording was performed by FM recording at 100 BPI.

The pre-recorded magnetic tracks were provided with a second magnetic layer to serve as the coding layer using a screen printing technique to produce the second magnetic layer.

The magnetic ink was produced according to the following blending ratio.
Carbonyl iron powder
(coercive force 10 oersted;

| Specific surface area 1 m$^2$/g) | 100 weight parts |
|---|---|
| Carbon black | 3 weight parts |
| Lecithin | 1 weight parts |

Vinyl chloride•vinyl acetate•

| vinyl alcohol copolymer | 20 weight parts |
|---|---|
| Polyurethane resin | 20 weight parts |
| Toluene | 60 weight parts |
| Methyethylkeytone | 60 weight parts |
| Methyisobutylketone | 60 weight parts |

After blending the above coating mixture in a ball mill for eight hours, five parts by weight of polyisocyanate resin was added and the mixture was further blended for one hour to produce a screen printing ink for the second magnetic layer to serve as the coding layer.

Using a screen printing technique, the above screen printing ink was used to form the coding layer, by forming the coding layer on the first magnetic layer on the stock sheet which had been magnetically recorded, and printing and drying to form the coding layer of 6 $\mu$m thickness. Cads of JIS size (54×84 mm) were punched out from the stock sheet, and were evaluated as follows.

After the regions of the track T$_2$, where the coding layer is formed, was DC-erased at a magnetic force suitable for a 3,000 oersted force magnetic layer. the region was read with a magnetic read head under a 500 gauss biasing magnetic field. The recorded information on the first magnetic layer was erased, but the information from the first magnetic layer was transferred and fixated in the second magnetic layer thus forming the coding information, and it was possible to read this coding information.

On the regions of the card other than the track T$_2$, magnetic recordings were made using the magnetic head suitable for saturation of a magnetic layer at 3,000 oersted by FM recording at 100 BPI. It was possible to carry out normal recording and reproduction, i.e. the cards were useable as ordinary magnetic cards.

Experimental Example 9

Except for using the coating mixture of the following blending mixture for the second magnetic layer, production conditions remained the same as in Example 8.
Manganese-Zinc ferrite powder
(coercive force 20 oersted;

| Specific surface area 10 m$^2$/g) | 100 weight parts |
|---|---|
| Carbon black | 3 weight parts |
| Lecithin | 1 weight parts |

Vinyl chloride•vinyl acetate•

| vinyl alcohol copolymer | 20 weight parts |
|---|---|
| Polyurethane resin | 20 weight parts |
| Toluene | 60 weight parts |
| Methyethylkeytone | 60 weight parts |
| Methyisobutylketone | 60 weight parts |

From the stock sheet thus produced, cards of JIS size (54×84 mm) were punched out, and were evaluated in the same way as in Example 7. The results were similar to those obtained in Example 6.

On the regions of the card other than the track T$_2$, magnetic recordings were made using the magnetic head capable of recording on a magnetic layer of 3,000 oersted by FM recording at 100 BPI. It was possible to carry out normal recording and reproduction, i.e. the cards were useable as ordinary magnetic cards.

Experimental Example 10

Except for using the coating mixture of the following blending ration for the second magnetic layer, production conditions remained the same as in Example 6.
Permalloy powder
(coercive force 0.006 oersted;

| specific surface area 1 m$^2$/g) | 100 weight parts |
|---|---|
| Carbon black | 3 weight parts |
| Lecithin | 1 weight parts |

Vinyl chloride•vinyl acetate•

| vinyl alcohol copolymer | 20 weight parts |
| --- | --- |
| Polyurethane resin | 20 weight parts |
| Toluene | 60 weight parts |
| Methyethylkeytone | 60 weight parts |
| Methyisobutylketone | 60 weight parts |

The coating mixture was blended in a ball mill for eight hours, and after adding polyisocyanate resin by 5 weight parts, the mixture was blended further for one hour to obtain a coating mixture for the second magnetic layer.

Coating was carried out by coating the first magnetic layer on top of the stock sheet, and applying the second coating on top of the first magnetic layer. The procedure was the same as that for making the first magnetic layer. However, as shown in FIG. 15, before applying the second coating, magnetic pre-recording is made on the first magnetic layer using magnetic recording head. The magnetic recording was made with a recording head 70 having a head gap of 50 μm with a pulsed current sufficient to saturate the first magnetic layer at a FM rate of 100 BPI.

Next, as shown in FIG. 15, the coating head was used to apply the coating for the second magnetic layer for the coding layer, and the coated sheet was dried in the dryer section to produce the second magnetic layer of 6 μm thickness serving as the coding layer and the stock sheet was rolled up. Cards of JIS size (54×84 mm) was punched out from the stock sheet, and were evaluated as follows.

That is, after the regions where the second magnetic layer is formed, as shown in FIG. 13 (A), was DC-erased at a magnetic force suitable for 3,000 oersted force magnetic layer, the region was read with a magnetic read head under a 500 gauss biasing magnetic field. The information on the first magnetic layer was erased, but the information from the first magnetic layer was transferred and fixated in the second magnetic layer thus forming the coding information, and it was possible to read this information.

On the regions of the card other than the track $T_2$, magnetic recordings were made using the magnetic head capable of recording on a magnetic layer of 3,000 oersted by FM recording at 100 BPI. It was possible to carry out normal recording and reproduction, i.e. the cards were useable as ordinary magnetic cards.

Experimental Example 11

The coating mixture for making peeling layer was made in the following blending ratio.

| Acrypolyol resin | 15 weight parts |
| --- | --- |
| Isocyanate hardener | 1 weight parts |
| Silicone oil | 1 weight parts |
| Toluene | 40 weight parts |
| Methyethylkeytone | 40 weight parts |

Next, the peeling layer of 1 μm was produced on a polyester film of 25 μm thickness by applying the above coating mixture with the Gravure coater, and by drying the coating.

A coating mixture for the protective covering layer was produced by blending the following materials.

| Nitrocellulose resin | 10 weight parts |
| --- | --- |
| Polyurethane resin | 9 weight parts |

-continued

| Isocyanate resin | 1 weight parts |
| --- | --- |
| Toluene | 40 weight parts |
| Methyethlkeytone | 40 weight parts |

Next, the protective covering layer of 1 μm thickness was produced by applying the above mixture on top of the above peeling layer with a Gravure coater.

Next, a coating mixture for the second magnetic layer was made in the following blending ratio.
Barium ferrite powder (BaO•6Fe$_2$O$_3$)
(coercive force 2750 oersted;

| Specific surface area 8 m$^2$/g) | 100 weight parts |
| --- | --- |
| Carbon black | 3 weight parts |
| Lecithin | 1 weight parts |

Vinyl chloride•vinyl acetate•

| vinyl alcohol copolymer | 20 weight parts |
| --- | --- |
| Polyurethane resin | 20 weight parts |
| Toluene | 60 weight parts |
| Methyethylkeytone | 60 weight parts |
| Methyisobutylketone | 60 weight parts |

The coating mixture was blended in a ball mill for eight hours, and after adding 5 weight parts of polyisocyanate, the mixture was further blended for one hour to make the coating mixture for the second magnetic layer. The coating was performed using the ordinary method for making a magnetic recording medium. That is, coating was applied on top of the protective covering layer with a Gravure coater, and before the coating is dried, magnetic orientation was performed. The coating was dried to produce a magnetic layer of 12 μm thickness, and this stock sheet was rolled up.

The first magnetic layer was produced from the following coating mixture.
Carbonyl iron powder
(coercive force 40 oersted;

| Specific surface area 1 m$^2$/g) | 100 weight parts |
| --- | --- |
| Carbon black | 3 weight parts |
| Lecithin | 1 weight parts |

Vinyl chloride•vinyl acetate•

| vinyl alcohol copolymer | 20 weight parts |
| --- | --- |
| Polyurethane resin | 20 weight parts |
| Toluene | 60 weight parts |
| Methyethylkeytone | 60 weight parts |
| Methyisobutylketone | 60 weight parts |

The coating mixture was blended in a ball mill for eight hours, and after adding 5 weight parts of polyisocyanate hardener, the mixture was further blended for one hour to make the coating mixture for the first magnetic layer. The first magnetic layer was produced applying the above coating mixture on top of the second magnetic layer with a Gravure coater.

Before applying the first magnetic layer (before Gravure coating to make the first magnetic layer on top of the stock sheet having the second magnetic layer already coated), magnetic recording is made on the second magnetic layer using a magnetic recording head with, for example, a recording head having a 50 μm head gap at a pulsed current capable of saturating the second magnetic layer.

The recording was made by arranging the magnetic recording head in the width direction of the stock sheet, because the sheet was eventually cut into tapes.

The magnetic recording was performed by FM recording at 100 BPI. The recorded data on the second magnetic layer generated bar-code type patterns on the first magnetic layer.

Next, the coating was applied to make the first magnetic layer, and the coating was dried in the dryer to make the coding layer of 6 μm thickness. Thus, the bar-code type patterns were formed and fixated in the first magnetic layer serving as the coding layer containing the bar-code-type patterns 96a shown in FIG. 19.

Next, the coating mixture for the adhesive layer was produced in the following blending ratio.

Vinyl chloride•vinyl acetate•

| copolymer resin | 5 weight parts |
| --- | --- |
| Polyester resin | 15 weight parts |
| Toluene | 40 weight parts |
| Methyethylkeytone | 40 weight parts |

The above coating mixture was applied on top of the first magnetic layer, and the coating was dried in the dryer to make a hot melt adhesive layer of 10 μm thickness.

The stock sheet thus produced was cut into strips of 6.5 mm width to obtain magnetic transfer tape. Using this magnetic transfer tape, the magnetic layer was thermally transferred onto a polyvinyl sheet of 100 μm thickness, and the holding base material of a polyester film of 25 μm thickness was peeled off.

The vinyl chloride sheet with the double magnetic layers thus produced, center core material of 560 μm thickness and the overlaying sheet of vinyl chloride of 100 μm thickness was piled on top of each other, and were thermally compressed to a thickness of 760 μm. The stock sheet was punched out to make JIS size recording medium (cards) with magnetic stripes.

The above produced cards were evaluated as follows.

The magnetic stripe regions were DC-erased at a saturation magnetic field suitable for the 2750 oersted layer, and the magnetic card was read with a magnetic read head with a biasing magnetic field of 1 KG. The bar-code type patterns fixated in the coding layer and the signals from the card shown in FIG. 25 were identified. This coding information corresponded to those inputted in the second magnetic layer before the coding layer was applied. This information was neither alterable or erasable afterwards.

Next, using the recording magnetic head, magnetic recordings were made using current pulses to sufficiently saturate the second magnetic layer. The information was subsequently read with a read head without any problems.

Experimental Example 12

A coating mixture for making the magnetic transfer layer was made in the following blending ratio.
Barium ferrite powder (BaO•6Fe$_2$O$_3$)
(coercive force 2750 oersted;

| Specific surface area 8 m$^2$/g) | 100 weight parts |
| --- | --- |
| Carbon black | 3 weight parts |
| Lecithin | 1 weight parts |

Vinyl chloride•vinyl acetate•

| vinyl alcohol copolymer | 20 weight parts |
| --- | --- |
| Polyurethane resin | 20 weight parts |
| Toluene | 60 weight parts |
| Methyethylkeytone | 60 weight parts |
| Methyisobutylketone | 60 weight parts |

The coating mixture was blended in a ball mill for eight hours, and after adding 5 weight parts of polyisocyanate hardener, the mixture was further blended for one hour to make the coating mixture for the magnetic transfer layer. The coating operation was according to the usual method for making magnetic recording medium. Before the coating is dried, magnetic orientation was performed. The coating was dried in the dryer to make the magnetic transfer layer of 12 μm thickness.

Next, a coating mixture for the peeling layer was produced in the following blending ratio.

| Acrylpolyole resin | 15 weight parts |
| --- | --- |
| Isocyanate hardener | 1 weight parts |
| Silicone oil | 1 weight parts |
| Toluene | 40 weight parts |
| Methylethylkeytone | 40 weight parts |

The above coating mixture was applied on top of the magnetic transfer layer with a Gravure coater to make the peeling layer of 1 μm thickness.

Next, a coating mixture for the protective covering layer was produced in the following blending ratio.

| Nitrocellulose resin | 10 weight parts |
| --- | --- |
| Polyurethane resin | 9 weight parts |
| Isocyanate hardener | 1 weight parts |
| Toluene | 40 weight parts |
| Methylethylkeytone | 40 weight parts |

Next the above coating mixture for the protective covering layer was applied on top of the peeling layer with a Gravure coater, and dried to make the protective covering layer of 1 μm thickness.

Next, a coating mixture for the second magnetic layer to serve as the coding layer was made in the following blending ratio.
Carbonyl iron powder
(coercive force 40 oersted;

| Specific surface area 1 m$^2$/g) | 100 weight parts |
| --- | --- |
| Carbon black | 3 weight parts |
| Lecithin | 1 weight parts |

Vinyl chloride•vinyl acetate•

| vinyl alcohol copolymer | 20 weight parts |
| --- | --- |
| Polyurethane resin | 20 weight parts |
| Toluene | 60 weight parts |
| Methyethylkeytone | 60 weight parts |
| Methyisobutylketone | 60 weight parts |

The coating mixture was blended in a ball mill for eight hours, and after adding 5 weight parts of polyisocyanate hardener, the mixture was further blended for one hour to make the coating mixture for the second magnetic layer to serve as the coding layer. This coating mixture was applied on the protective covering layer with a Gravure coater, and dried to make the coding layer of 6 μm.

Before applying the second magnetic layer (before Gravure coating to make the second magnetic layer on top of the stock sheet having the protective covering layer already printed), magnetic recording is made on the magnetic transfer layer using a recording magnetic head with, for example, a recording head having a 50 μm head gap at a pulsed current capable of saturation recording on the magnetic transfer layer.

The recording was made by arranging the magnetic recording heads in the width direction of the stock sheet, because the sheet was eventually cut into tapes.

The magnetic recording was performed by FM recording at 100 BPI. The recorded data on the magnetic transfer layer generated bar-code type patterns on the second magnetic layer.

The results demonstrated that bar-code type patterns were formed and fixated in the second magnetic layer.

Next, a coating mixture for the adhesive layer was made in the following blending ratio.
Vinyl chloride•vinyl acetate•

| | |
|---|---|
| copolymer resin | 5 weight parts |
| Polyester resin | 15 weight parts |
| Toluene | 40 weight parts |
| Methyethylkeytone | 40 weight parts |

The above coating mixture for the adhesive layer was applied with a Gravure coater on the coding layer, and dried to make the hot melt adhesive layer of 10 μm thickness.

The stock sheet thus produced was cut into strips of 6.5 mm width to obtain the magnetic transfer tape. Using these magnetic transfer tapes, the magnetic transfer layer was thermally compressed on the coding layer. That is, the holding base material of polyester film of 25 μm thickness, the magnetic transfer layer and the peeling layer were peeled off, thus forming the coding layer having the fixated identifier coding information on the vinyl chloride sheet base material.

Also, to provide regular magnetic recording stripes, the regular magnetic transfer tape was used to thermally transfer on the other region of the vinyl sheet to make the first magnetic layer, thus making stripes for regular magnetic layer.

The stock sheet was produced by piling the vinyl chloride sheet having the stripes for fixated identifier coding information and for regular magnetic recording, the vinyl chloride sheet of 560 μm for the center core, the overlay sheet of 100 μm thickness on top of each other and thermally pressing to make a thickness of 760 μm. The stock sheet was punched out to make JIS size cards (54×84 mm) to produce magnetic recording medium (magnetic cards) having magnetic stripes.

The cards were evaluated as follows.

The magnetic stripe section having the identifier coding information was read with a magnetic read head under an external biasing magnetic field of 1 KG. The identifier coding information in the second magnetic layer serving as the coding layer containing bar-code type patterns were observed. The patterns corresponded to the patterns which were inputted on the magnetic transfer layer of high coercivity before applying the second magnetic layer. The signals of the coding information, of the bar-code-type patterns shown in FIG. 25, could neither be altered or erased subsequently.

Next, using a recording magnetic head, regular magnetic recordings were made with a regular recording head at current pulses sufficient to saturate the first magnetic layer of the recording magnetic stripe, and the information was later read with a magnetic read head. There was not problem in reading the information.

What is claimed is:

1. A method for making a magnetic recording medium comprising at least one magnetic layer having magnetic particles dispersed in a dried coating mixture applied on a non-magnetic base material, comprising the steps of:

applying a coating mixture comprising magnetic particles dispersed at a predetermined concentration on said base material to produce a coated sheet;

subjecting said coated sheet to a magnetic encoding process while the magnetic particles are mobile by applying a magnetic field so as to move said magnetic particles in said coating sheet and to form concentration gradients of higher concentration areas and lower concentration areas than said predetermined concentration in the distribution of said magnetic particles; and drying said coating sheet so as to fixate said concentration gradients in-situ to produce a stock sheet having said at least one magnetic layer having magnetic particles fixated in a dried coating mixture, wherein said magnetic encoding process and said drying convert said at least one magnetic layer to a coding layer in which identifier coding information, which is derived from said concentration gradients of higher concentration areas and lower concentration areas in the distribution of said magnetic particles comprising designed patterns, letters or bar-code-type patterns is fixated for forgery prevention, wherein a first magnetic layer is formed on said base material by applying a first coating mixture to produce a magnetic layer having a coercive force of not less than 250 oersted and not more than 4,000 oersted, and drying the coating mixture;

recording identifier coding information on said first magnetic layer, applying a second coating mixture having a coercive force of not less than 4,000 oersted on said first magnetic layer to produce a second magnetic layer so as to duplicate the identifier coding information recorded in said first magnetic layer in said second magnetic layer, and drying said second magnetic layer to produce a coding layer containing non-erasable and non-alterable fixated identifier coding information for forgery prevention.

2. A method as claimed in claim 1, wherein said coding information recorded on said first magnetic layer is transferred to said second coating mixture before said second coating mixture is dried so as to fixate said coding information in-situ.

3. A method for making a magnetic recording medium comprising at least one magnetic layer having magnetic particles dispersed in a dried coating mixture applied on a non-magnetic base material, comprising the steps of:

applying a coating mixture comprising magnetic particles dispersed at a predetermined concentration on said base material to produce a coated sheet;

subjecting said coated sheet to a magnetic encoding process while the magnetic particles are mobile by applying a magnetic field so as to move said magnetic particles in said coating sheet and to form concentration gradients of higher concentration areas and lower concentration areas than said predetermined concentration in the distribution of said magnetic particles; and drying said coating sheet so as to fixate said concentration gradients in-situ to produce a stock sheet having said at least one magnetic layer having magnetic particles fixated in a dried coating mixture, wherein said magnetic encoding process and said drying convert said at least one magnetic layer to a coding layer in which identifier coding information, which is derived from said concentration gradients of higher concentration areas and lower concentration areas in the distribution of said magnetic particles comprising designed patterns, letters or bar-code-type patterns is fixated for forgery prevention, wherein a first magnetic layer is formed on said base material by applying a first coating mixture having a coercive force of not less than 250 oersted and not more than 4,000 oersted, and drying to produce a first magnetic layer;

recording magnetic information on said first magnetic layer;

applying a second coating mixture having a coercive force of not more than 100 oersted on said first magnetic layer to produce a second magnetic layer so as to form protrusions in said second coating mixture by the magnetic field generated by said first magnetic layer; and drying said second magnetic layer to produce said protrusions forming designed patterns, letters or bar-code-type patterns formed by localized regions of different concentrations of magnetic particles, pre-recorded and fixated for forgery prevention.

* * * * *